US009004562B2

(12) United States Patent
Morin et al.

(10) Patent No.: US 9,004,562 B2
(45) Date of Patent: Apr. 14, 2015

(54) APPARATUS AND METHOD FOR REMOTELY BLOCKING A CAVITY OF AN ENERGIZED ELECTRICAL TRANSMISSION SYSTEM

(75) Inventors: Leo Morin, Edmonton (CA); Keith I. Yeats, Edmonton (CA); Martin S. Niles, Stony Plain (CA); Casey Douglas Merrills, Carvel (CA); Edmond LeRouzic, Edmonton (CA)

(73) Assignee: Cantega Technologies Inc., Edmonton, Alberta (CA)

( * ) Notice: Subject to any disclaimer, the term of this patent is extended or adjusted under 35 U.S.C. 154(b) by 0 days.

(21) Appl. No.: 13/420,466

(22) Filed: Mar. 14, 2012

(65) Prior Publication Data

US 2013/0239482 A1 Sep. 19, 2013

(51) Int. Cl.
  *B66F 19/00* (2006.01)
  *F16L 55/11* (2006.01)
  *H02G 1/02* (2006.01)
(52) U.S. Cl.
  CPC .............. *F16L 55/1141* (2013.01); *H02G 1/02* (2013.01); *Y10T 29/49826* (2015.01)
(58) Field of Classification Search
  USPC ................ 294/19.1, 209, 174, 22–24; 81/3.8, 81/53.1; 174/5 F, 52.1, 135, 41, 40 R, 174/138 E; 439/134–135, 580; 269/3, 6, 95; 29/244, 270, 278
  See application file for complete search history.

(56) References Cited

U.S. PATENT DOCUMENTS

| 2,275,903 | A | * | 3/1942 | Hermann | 294/174 |
| 2,352,686 | A | * | 7/1944 | Broadbooks | 81/53.1 |
| 2,379,433 | A | * | 7/1945 | Hemmerling | 29/273 |
| 2,543,862 | A | * | 3/1951 | Manahan | 294/174 |
| 2,824,190 | A | * | 2/1958 | Mikos | 337/156 |
| 2,966,817 | A | * | 1/1961 | Wengen | 81/53.1 |
| 4,493,344 | A |   | 1/1985 | Mathison et al. | |
| 4,577,450 | A | * | 3/1986 | Large | 52/787.12 |
| 4,891,016 | A |   | 1/1990 | Luzzi et al. | |
| 5,650,594 | A | * | 7/1997 | Urnovitz | 174/139 |
| 6,725,745 | B1 |  | 4/2004 | Palmieri | |
| 7,154,034 | B2 |  | 12/2006 | Lynch | |

OTHER PUBLICATIONS

Midsun Group TM, "E/Products", <www.midsungroup.com/new_page_5.htm>, at least as early as May 2008, 2 pages.

(Continued)

*Primary Examiner* — Stephen Vu
(74) *Attorney, Agent, or Firm* — Anthony R. Lambert

(57) ABSTRACT

An apparatus and method are used for remotely blocking a cavity of a component_of an energized electrical transmission system. A protector has a blocking part for blocking the cavity of the component. The protector has a hotstick connector. A dielectric hotstick has an engagement part such as a hook at a remote end of the dielectric hotstick. The hook may be removably connected to the external point of attachment for remote installation of the blocking part blocking the cavity within a component, such as a piece of equipment or support structure. The blocking part may be remotely installed blocking the cavity using a dielectric hotstick operated by a user who is in a position outside a safe Limit of Approach. The blocking part may comprise a compressible material such as rubber or memory foam.

18 Claims, 22 Drawing Sheets

(56) References Cited

OTHER PUBLICATIONS

Salisbury by Honeywell, "AltaLink proactively reduces risk of power outages, protects wildlife, and improves substation reliability with Greenjacket® from Cantega Technologies Inc.", Greenjacket® "It Fits", Nov. 2010, 4 pages.

Salisbury, Outage protection, excerpts from Salisbury CD catalogue, at least as early as 2006, 18 pages.

Salisbury by Honeywell, Substation cover-up—switch jaw and barrier, <www.salisburybyhoneywell.com/en-US/Pages/Category.aspx?category=substation_cover-up_switch_jaw_guard&cat=HLS-HES>, at least as early as Feb. 2012, 1 page.

Salisbury by Honeywell, TD Tagging Device, <http://www.salisburybyhoneywell.com/en-US/Pages/Product.aspx?category=Line_Hose_and_covers&cat=HLS-HES&pid=TD>, at least as early as Feb. 2012, 1 page.

Salisbury by Honeywell, "Utility products", excerpts from catalogue, at least as early as 2011, 51 pages.

"Week 07: transmission: component specifications", Electrical engineering, electrical power plant design, <www.oocities.org/engrabda/ppd/t/30sw.html>, at least as early as Feb. 2012, 5 pages.

Electrical Materials Company, "Wildlife Protectors", <www.electricalmaterialscompany.com/htm/wildlife_protectors.htm>, based on the best information available, this document or an earlier version of it was accessed on or before Sep. 11, 2009, 2 pages.

Electrical Materials Company, "Conduit Duct Plugs", <www.electricalmaterialscompany.com/htm/conduit_duct_plugs.htm>, based on the best information available, this document or an earlier version of it was accessed on or before Sep. 11, 2009, 1 page.

Omni, "Innerduct & Accessories", Jan. 2002, pp. 59-65.

\* cited by examiner

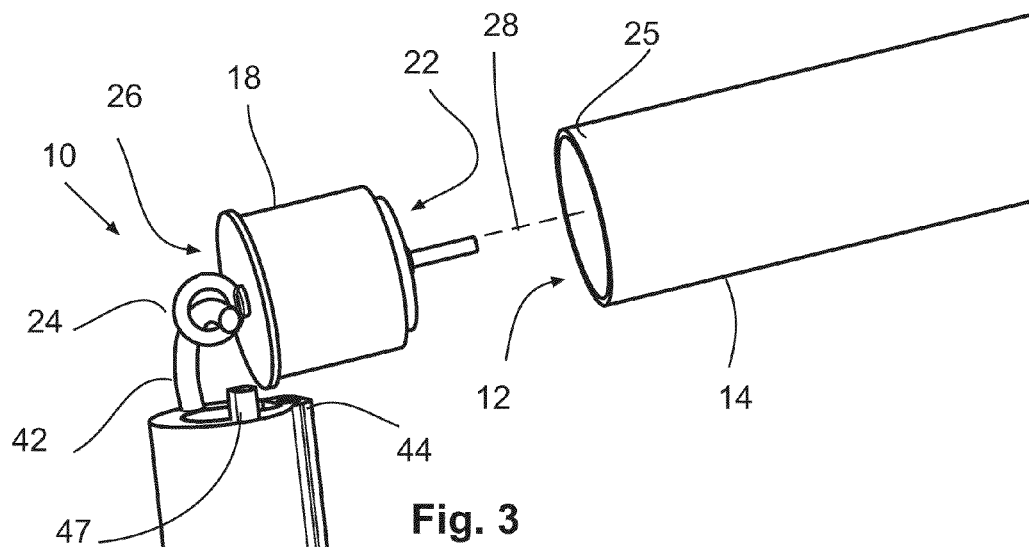
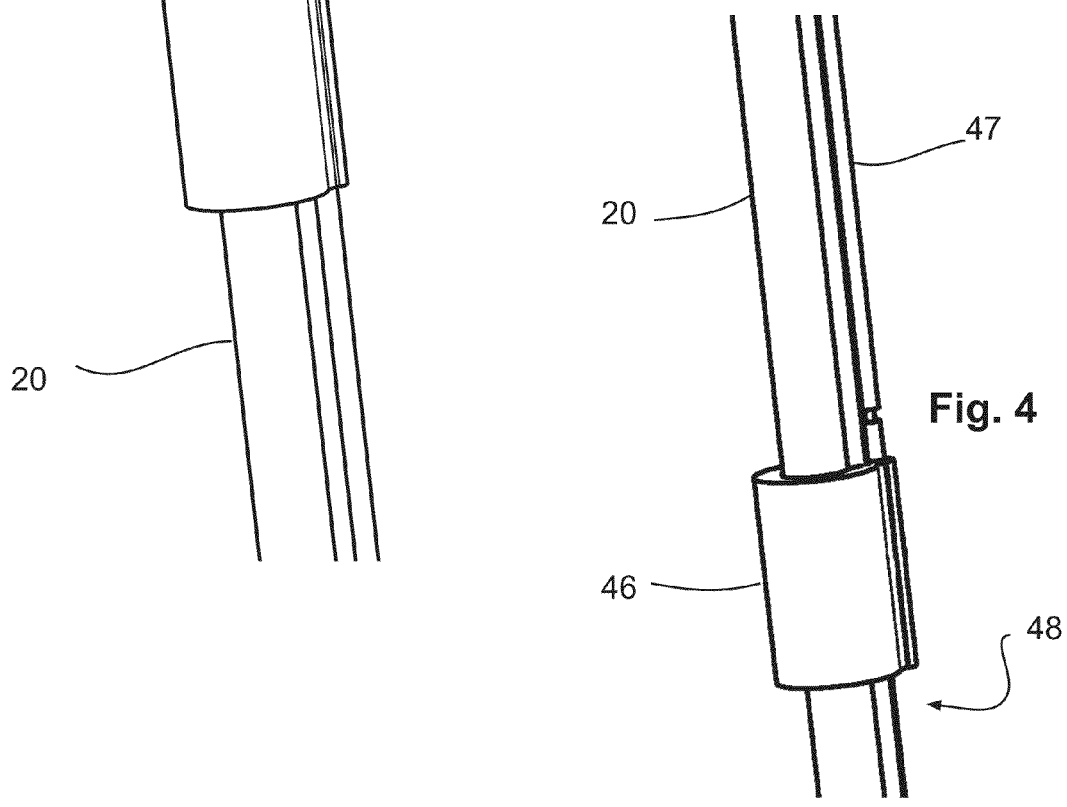
Fig. 3
Fig. 4

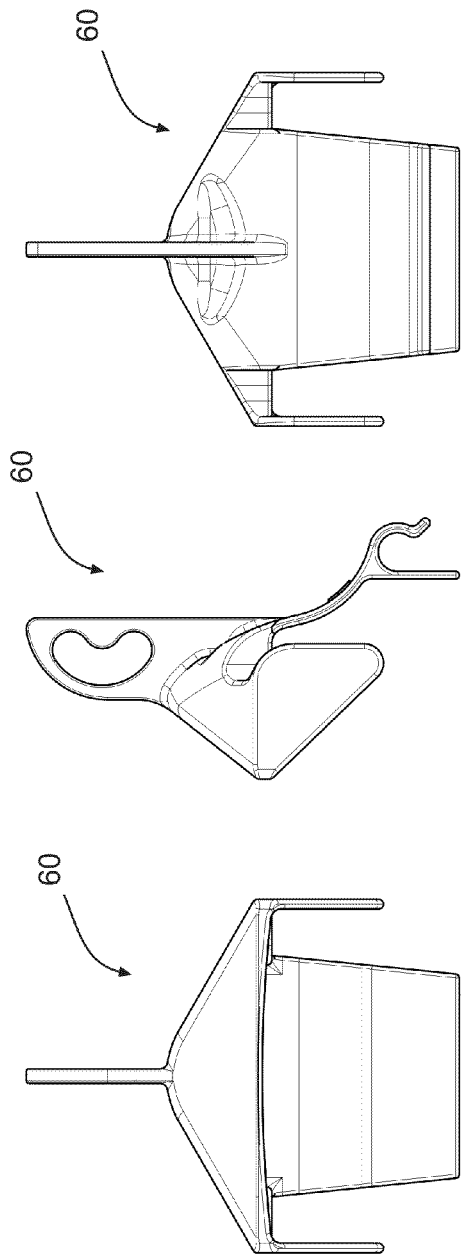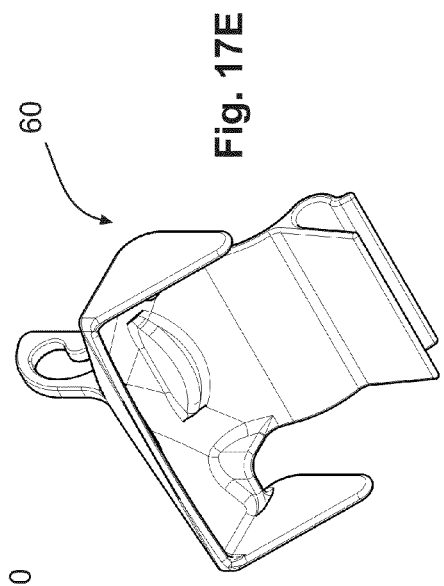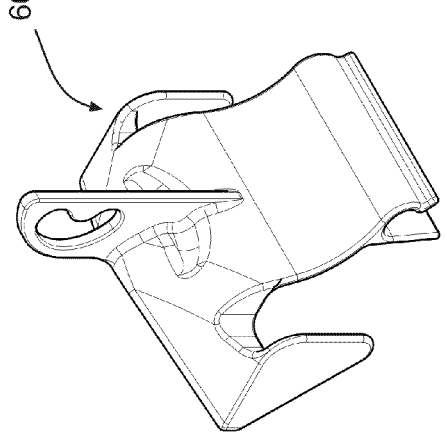

APPARATUS AND METHOD FOR REMOTELY BLOCKING A CAVITY OF AN ENERGIZED ELECTRICAL TRANSMISSION SYSTEM

TECHNICAL FIELD

This application relates to apparatuses and methods for remotely blocking a cavity of a component of an energized electrical transmission system.

BACKGROUND

Components such as conductors, equipment, or support structures of electrical transmission systems may have cavities, such as open ends, that afford attractive nesting or storage locations for various animals and birds. An example conductor of this type may be part of a pipe bus. Animals and birds may also use the openings of a structural box beam or the hinge cavity of a disconnect switch for example.

SUMMARY

An apparatus is disclosed for remotely blocking a cavity of a component, such as a conductor, equipment, or support structure, of an energized electrical transmission system or within the limits of approach of an energized electrical transmission system, the apparatus comprising: a protector having a blocking part for blocking the cavity of the component, the protector having a hotstick connector such as an external point of attachment; and a dielectric hotstick with an engagement part at a remote end of the dielectric hotstick, the engagement part being configured to engage the hotstick connector for remote installation of the blocking part at least partially in the cavity of the component. In one aspect, the protector is a cover, the blocking part is a cover end and the cavity is an open end or void of a conductor.

A method is also disclosed of remotely blocking a cavity of a component of an energized electrical transmission system, the method comprising: remotely installing a blocking part of a protector at least partially within the cavity to block the cavity of the component using a dielectric hotstick operated by a user who is in a position outside a safe Limit of Approach.

An apparatus is also disclosed for remotely blocking a cavity of a component of an energized electrical transmission system, the apparatus comprising: a protector having a blocking part for blocking the cavity of the component, the blocking part comprising material that is laterally expandable under longitudinal compression to engage an inside surface of a component, and a clamp for providing longitudinal compression on the material. The material may be a laterally expandable plug such as rubber or memory foam.

An insert is disclosed for being remotely placed at least partially into a hinge cavity of a hinge of a switch of an electrical transmission system using a tool having an engagement part and a handle part, the insert comprising: a blocking part for blocking the hinge cavity; a tool connector attached to the blocking part for engagement with the engagement part of the tool for remotely placing the insert; and a guiding part attached to the blocking part for engaging an external or internal part of the switch to secure the insert in the hinge cavity.

In one or more embodiments one or more of the following features may also be present: The hotstick connector comprises an external eyebolt, and the engagement part of the dielectric hotstick comprises a hook. The dielectric hotstick comprises a hook control element at an end of the dielectric hotstick opposed to the remote end, the hook control element being connected to open and close the hook to grip and release, respectively, the eyebolt. The eyebolt extends from an external end of the protector opposed to the blocking part, the external end adapted to be outset from the cavity of the component when installed blocking the cavity. The external end is flat. The protector comprises a plug. The blocking part comprises memory foam. The blocking part comprises rubber. The protector comprises material that is laterally expandable under longitudinal compression to engage an inside surface of a component, and a clamp for providing longitudinal compression on the material. The hotstick connector comprises one or more female parts, and the engagement part of the dielectric hotstick comprises one or more corresponding male parts. The protector comprises a plug. The protector comprises an external eyebolt; the dielectric hotstick comprises a hook at a remote end of the dielectric hotstick; and remotely installing is carried out with the hook removably connected to the external eyebolt. The component comprises a bus. The cavity is an open end of the component. The engagement part of the tool comprises a hook and the tool connector comprises an eyelet for receiving the hook. The eyelet is crescent shaped. The hinge has a pin, and the insert comprising a pin engaging part attached to the blocking part to engage the pin. The pin engaging part is configured to snap around the pin to help hold the insert in place in the hinge cup. The blocking part comprises a tongue.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1A is a perspective view of the cover of FIG. 1 installed blocking the previously open end of the component;

FIG. 3 is a close-up perspective view of the cover of FIG. 1 being remotely installed onto the open end of the conductor;

FIG. 4 is a close-up perspective view of a hook control element for gripping and releasing the cover of FIG. 3;

FIGS. 17A-E are rear elevation, side elevation, front elevation, upper perspective, and lower perspective views of the insert of FIG. 7.

DETAILED DESCRIPTION

Figure 1:
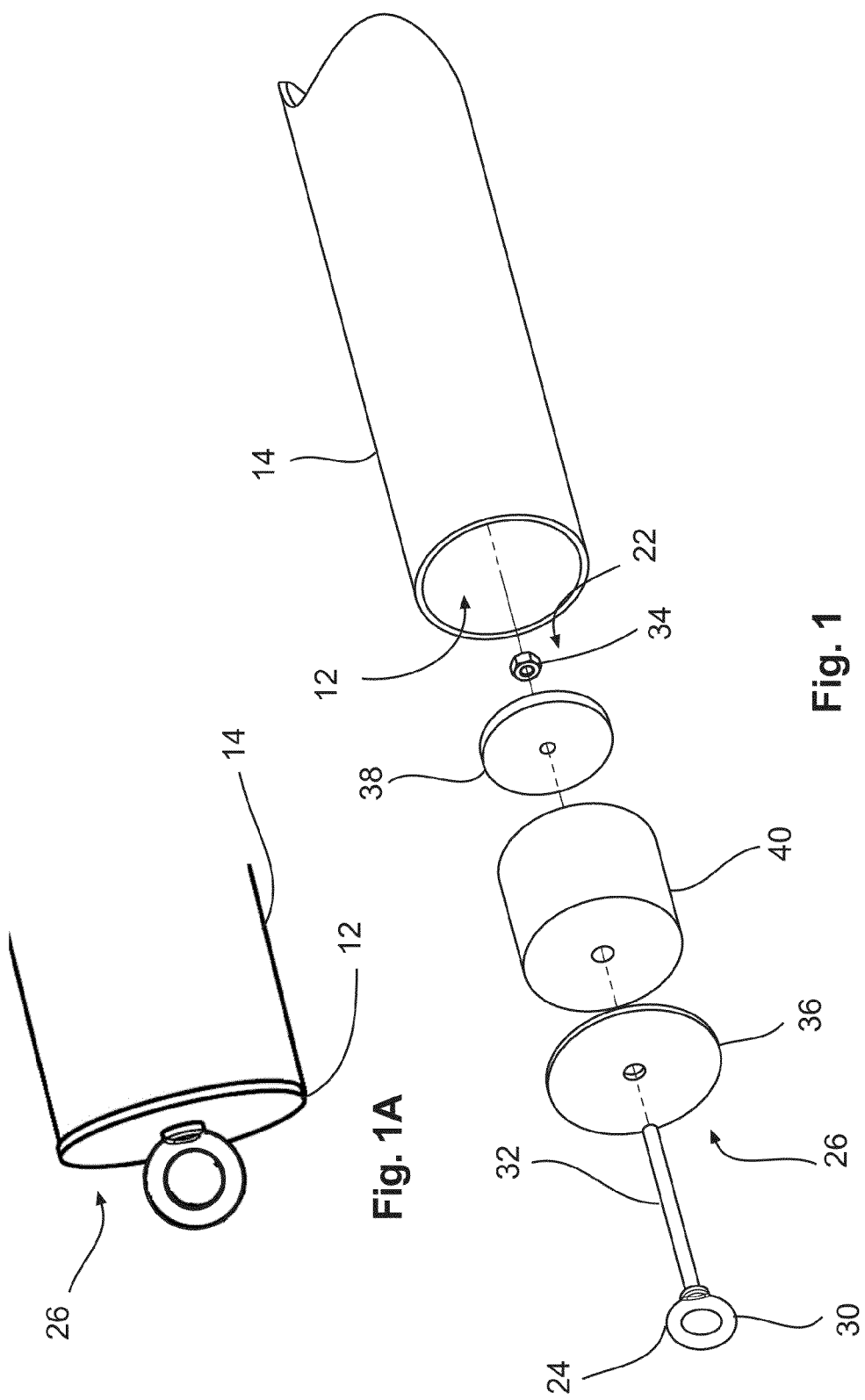
FIG. 1 is an exploded perspective view of a cover for blocking the cavity of a component.

Immaterial modifications may be made to the embodiments described here without departing from what is covered by the claims.

Electric poles, towers, and other electrical equipment including substations may have various open cavities in components, such as conductors, equipment, or support structures, that provide attractive roosts for birds, particularly in treeless regions. If the appendages of a bird/animal simultaneously contact a conductor and another energized object such as an adjacent conductor or a grounded structure such as a support tower or tree, the resulting electrical short-circuit can kill the bird/animal and also damage the power system. The electrical short can further cause electrical system damage resulting in power outages. Further, the nesting of birds in open cavities in electrical systems increases the risk that predators will be attracted to the nests and cause a power fault or outage. Predators can be mammals such as raccoons or cats, birds such as magpies, or snakes.

Substations transform power from transmission voltages to distribution voltages, typically ranging from 2400 volts to 37,500 volts. Distribution voltages allow for reduced system clearances. These reduced clearances between phases to ground and phase to phase, increase station susceptibility to bird or animal caused outages. Faults caused by birds and other animals often trigger sensitive relay protection schemes, resulting in substation lockouts, interrupting service to thousands or possibly tens of thousands of customers and at the same time damaging expensive substation equipment.

Thus, in the field of electrical power transmission and distribution there is a need to protect components such as conductors, equipment, or support structures, with open cavities in electrical power systems from intrusion or occupation by birds and other animals. The variety and number of proposed solutions for repelling birds and other animals from electrocution risks highlights the persistence and magnitude of the problems created by such undesirable intrusion.

The inventor's own prior patent document discloses protectors for components of electrical power transmission systems, see United States patent publication no. 20080123254, as well as methods of making such protectors. However, in order to install such protectors, a power-down of the electrical system may be required, which adds to the cost of protecting the electrical equipment.

Power downs for the purpose of measuring electrical equipment for protective covers can keep a system down for a half a day or longer time period, at great cost. Some systems are operated under the direction of a regulatory and scheduling authority that controls the system's downtime scheduling.

In locations with minimal spare power transmission capacity, it can be a challenge for a system to get the downtime needed to access its equipment. Because electrical systems are usually scheduled for maintenance downtime on a fairly short notice (typically a week for non-emergency situations), and because scheduled downtime may be cancelled by the Regulatory Authority on an extremely short notice, there is no guarantee that personnel will be available to install the required component during a system's available downtime period. As a result, a system can experience significant delays in protecting their equipment.

Thus, there is a need for installing protectors on energized equipment by a person positioned outside the Limits of Approach.

Figure 2:
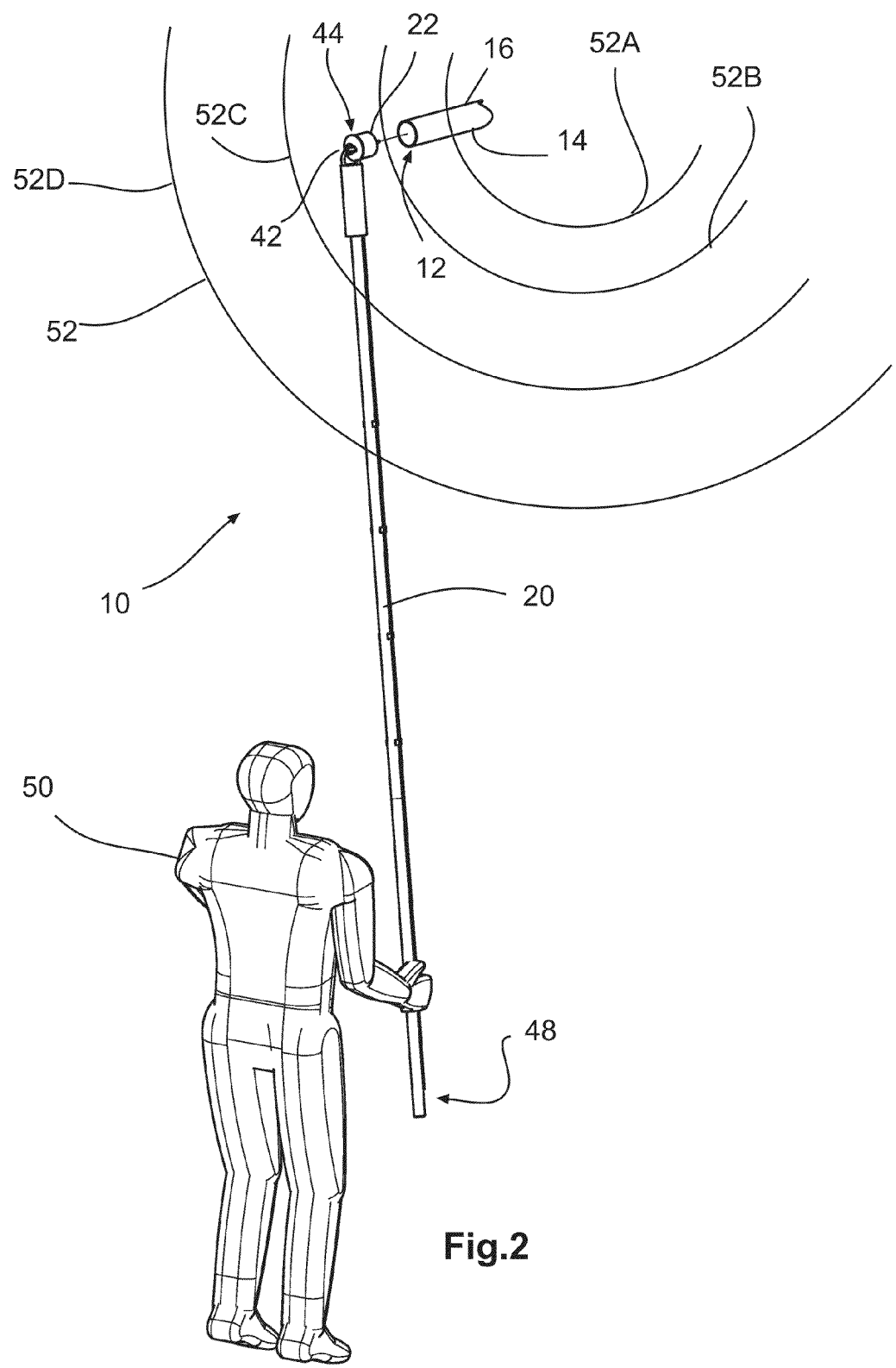
FIG. 2 is a perspective view of a user installing the cover of FIG. 1 over the open end of a conductor.

Referring to FIG. 2, an apparatus 10 for remotely blocking a cavity such as an open end 12 of a component, such as a conductor 14, of an energized electrical transmission system 16 is disclosed. Referring to FIG. 3, apparatus 10 may comprise a cover 18 (protector), such as a plug, and a dielectric hotstick 20. Cover 18 may have a cover end 22 (blocking part) for blocking the open end 12 of the conductor 14. The cover end 22 may insert into the open end 12 as shown, or slip at least partially over and around the external circumferential surface area 25 of the conductor 14, or both. Open end 12 of conductor 14 is illustrated as having a circular cross-section, although this is not required and other cross-section shapes are possible such as polygon shapes. Cover 18 may have a hotstick connector such as an external eyebolt 24, which may extend from an external end 26 opposite the cover end 22. Eyebolt 24 may extend along an insertion axis 28 of the cover as shown, or eyebolt 24 may be at a suitable angle to axis 28. Referring to FIG. 1, external eyebolt 24 may comprise an eyelet 30 and a bolt 32. Bolt 32 may be positioned through aligned bores in the other components of the cover 18 as shown, securing the components together with a nut 34 at the cover end 22. Referring to FIG. 1A, the eyebolt 24 may extend from the external end 26. External end 26 may be adapted to be outset from the open end 12, for example if the external end 26 is flat across the open end 12 as shown, when installed blocking the open end 12. Outset in this context is understood to be the opposite of inset, in order to exclude the provision of a cavity in external end 26 of cover 18 of which animals would be able to occupy.

Between nut 34 and eyelet 30 may be various components, for example external and internal washers 36 and 38, respectively, and plug material 40. The nut 34 and eyebolt 24 together form an exemplary clamp for compressing the plug material 40 longitudinally and thus providing lateral expansion of the plug material 40. External washer 36 may act as a lid or cap. At least part of cover 18 may be magnetic, in order to magnetically secure to conductor 14. Plug material 40 may have a cross-section that is slightly larger than the bore of the conductor 14 and may be compressible, with varying degree of elasticity, to fit within the conductor 14 under compression. This ensures a tight fit within open end 12. Plug material 40 may comprise, for example memory foam, rubber or other compressible material. Suitable memory foam may have a range of density of 3-6 pounds per cubic foot. Memory foam may be advantageous because it is easily compressed and returns slowly to its original shape in order to fill and seal the open end 12 of the conductor 14. Thus, the memory foam may be compressed by an operator, by for example turning one or both of the nut 34 and eyelet 30 in relation to each other, and the cover 18 installed before full expansion has taken place. Memory foam is also adept at forming a suitable seal, which does not have to be a fluid-tight seal. In other embodiments, rubber may be used, for example with a density range from 0.945-1.2 grams per cubic centimeter. Suitable rubber may have a Poisson's ratio of 0.5, although materials exhibiting other values of Poisson's ratio may produce acceptable results. Other suitable materials may be used, such as polymers and elastomers. Suitable materials may have acceptable transverse profile deformation and maintain such deformation over time, when compressed longitudinally. Suitable materials such as rubber may also have a durometer range from 60 A to 90 A. For all ranges provided herein, materials with values outside the ranges are possible.

Although material 40 has been described with relation to the embodiment of cover end 22 being a plug, it should be understood that material 40 may also be used in other arrangements, for example if material 40 is arranged to surround the external circumferential surface area 25 of conductor 14. In this example, the material 40 would have a bore for receiving conductor and the bore would be dimensioned to be slightly larger than the outer diameter of the conductor 14 so that the material 40 would fit with a compressed fit on the outside of the conductor 14.

Referring to FIG. 2, dielectric hotstick 20 may have an engagement part such as a hook 42, at a remote end 44 of the dielectric hotstick 20. Referring to FIG. 3, in use, the hook 42 engages the external eyebolt 24 for remote installation of the cover end 22 blocking the open end 12 of the conductor 14. The cover 18 is configured so that the external eyebolt 24 extends externally when the cover 18 is installed on the conductor. Referring to FIGS. 3 and 4, the dielectric hotstick 20 comprises a hook control element 46, for example a hand grip as shown, at an end 48 of the dielectric hotstick 20 opposed to the remote end 44. The hook control element 46 may be connected to open and close the hook 42 to grip and release, respectively, the eyebolt 24. Control element 46 may operate a dielectric control rod 47 that opens and closes the hook 42. Hotstick 20 may be used to grip the cover 18, place the cover end 18 blocking the open end 12, and then release the cover 18 in place. In some embodiments, the hotstick, for example a shotgun hotstick, may be telescopic. The construction of hot stick stock 20 should meet regulatory requirements and may have a length sufficient to provide limit of approach protection for high voltage power equipment energized at more than 750 V. The use of hook 42 and eyebolt 24 allows the insertion axis 28 of the cover 18 to be angled relative to the hotstick 20 shaft, in order to allow cover 18 to be easily installed in elevated conductors from the ground level, or from other generally awkward positions.

Referring to FIG. 2, an exemplary method of remotely blocking an open end 12 of a conductor 14, for example a sliding pipe bus, of an energized electrical transmission system 16 is illustrated. Cover end 22 is remotely installed blocking the open end 12 of the conductor 14 using dielectric hotstick 20 operated by a user 50 who is in a position outside a safe Limit of Approach, for example limit of approach 52D. Remotely installing may be carried out with hook 42 removably connected to the external eyebolt 24. Standard limits of approach are generally set by the IEEE for live electrical systems. It should be understood that the limits of approach may vary according to region. The limits of approach 52 around energized equipment generally widens as the voltage increases. In the illustration of FIG. 2, the limits of approach 52 correspond to increasing voltages, and thus increasing radii, from limits of approach 52A-52D. For this purpose, hotstick 20 may be provided in a length that is suitable for the various limits of approach standards in all jurisdictions. In some embodiments, the conductor 14 comprises non-energized, for example grounded, electrical equipment that is located in close proximity to energized equipment of the energized electrical transmission system, and thus the conductor 14 lies within the Limit of Approach of the adjacent energized equipment.

The dielectric material which constitutes at least a part of the hot stick 20 may comprise a single part material or multiple part material mixed before application, and may be formulated from a combination of liquid and semi-solid or solid components. Electrical transmission system may refer to any apparatus intended to transmit power. It will be understood that the teachings equally apply and may be adapted to any commercially used voltage range or any suitable transmission system. In another embodiment the hot stick dielectric control rod 47 may be replaced with a different driving system, such as a pulley system. The driving system may be internal or external to the hotstick 20. Hot stick 20 may be separated into more than one part, for ease of transport. For example, hot stick 10 may collapse into three parts. For further example, hot stick 10 may be provided as a multi-part kit. Adhesive, for example pre-applied on the plug 40, may be used to affix the inserted parts within the cavity.

Figure 14A:
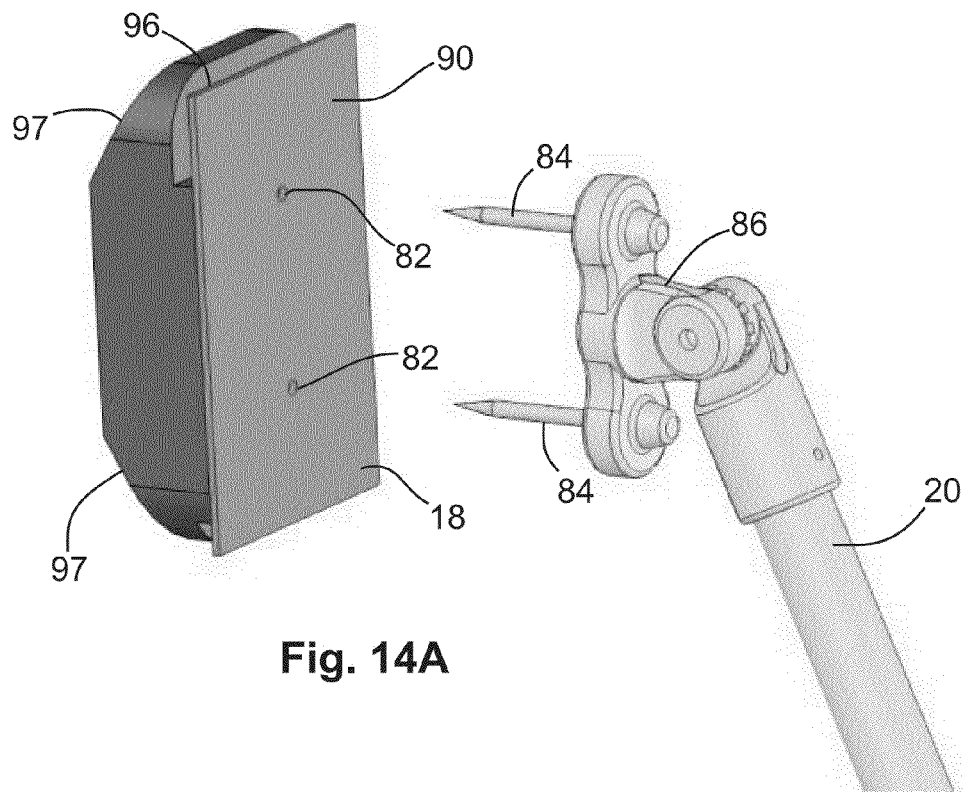
FIGS. 14A-D are a sequence of perspective views showing a procedure to install a protector for blocking a cavity of a box beam.
Figure 14B:
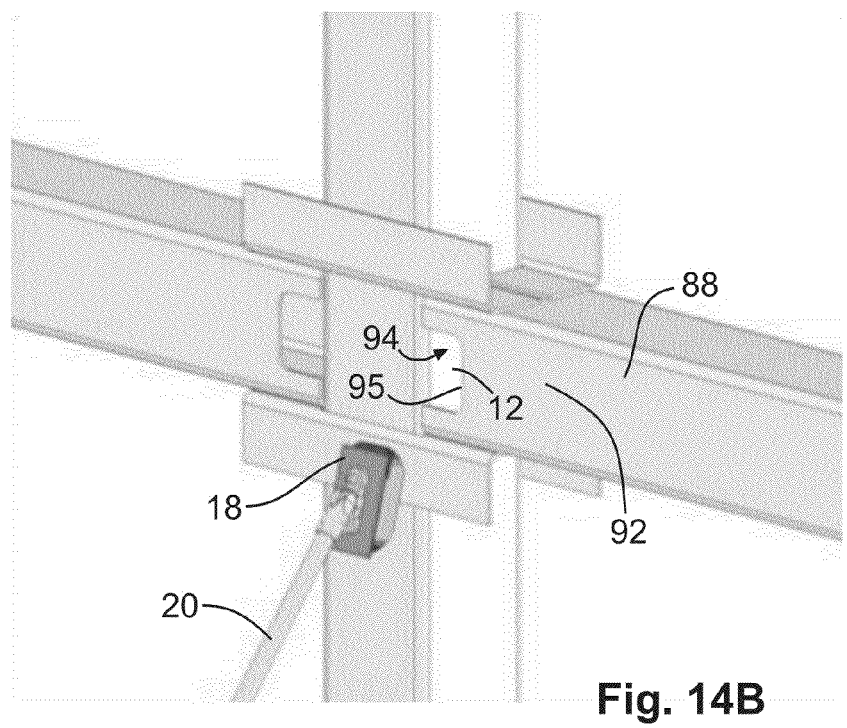
Figure 14C:
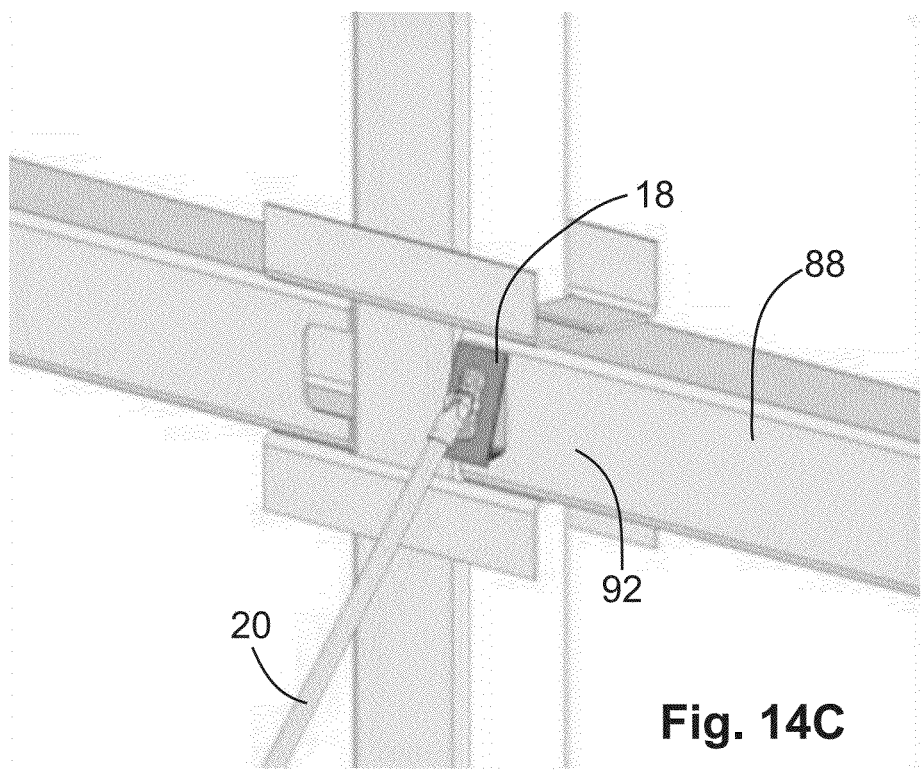
Figure 14D:
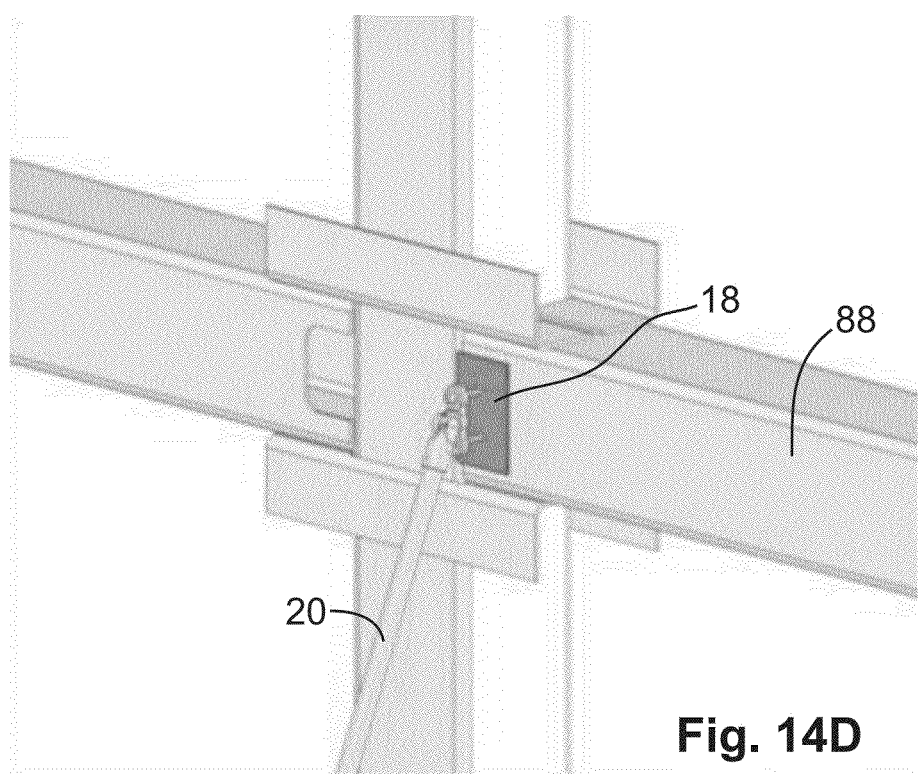
Figure 15:
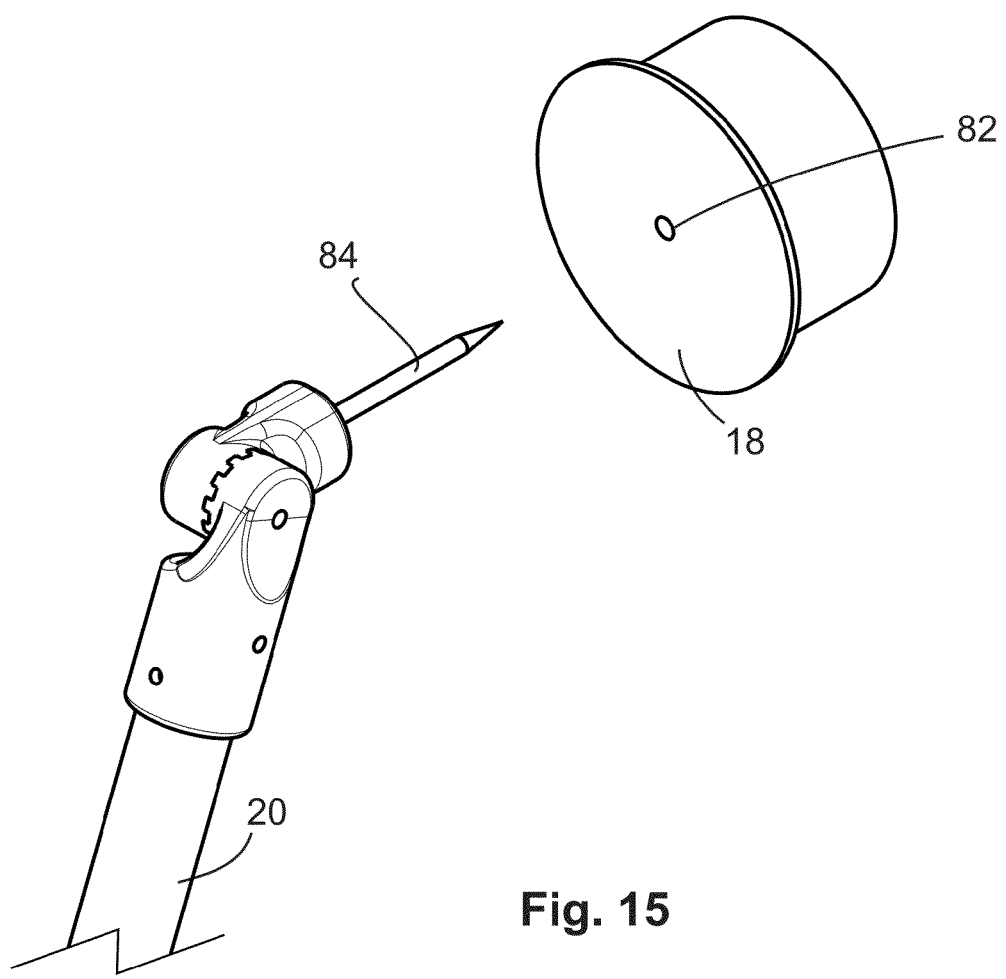
FIG. 15 is a perspective view of a further embodiment of a hotstick and a protector for blocking the cavity of a component.
Figure 16B:
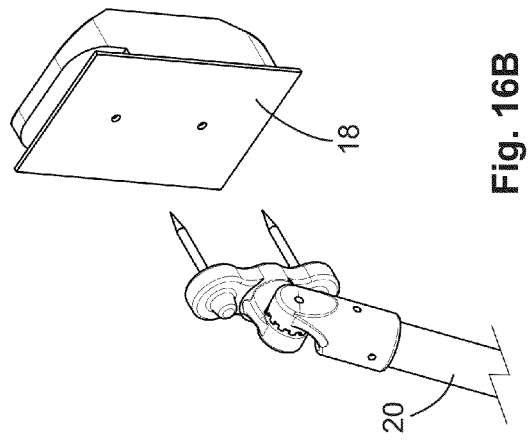
FIGS. 16A-D are side elevation or perspective views of the protector from FIG. 14A separated from the hotstick (FIGS. 16A-B) and connected to the hotstick (FIGS. 16C-D)
Figure 16D:
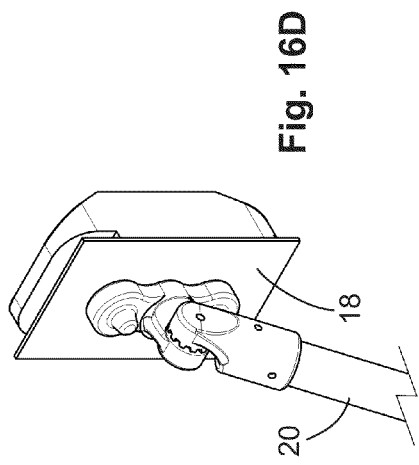
Figure 16A:
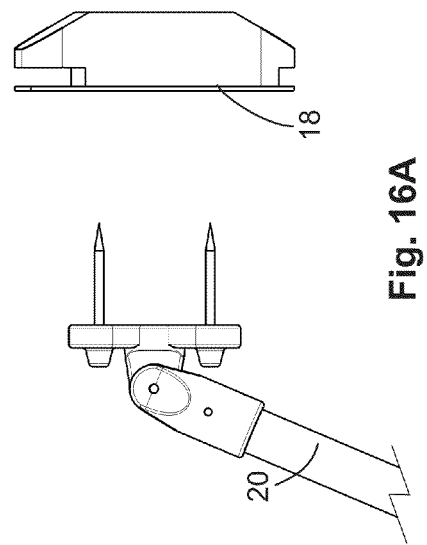
Figure 16C:
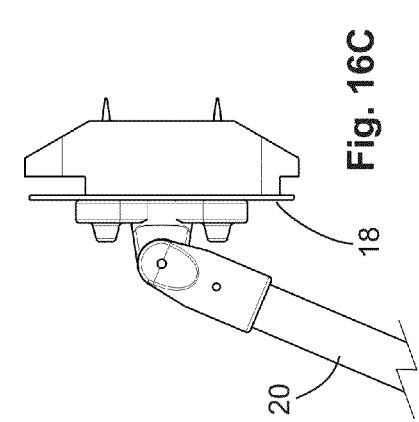

Referring to FIGS. 14A-D and 15 the hotstick connector may comprise one or more female parts 82, and the engagement part of the dielectric hotstick 20 comprises one or more corresponding male parts 84 (FIGS. 14A and 15). The male parts 84, for example one or more steel rods as shown, may be provided on an adapter 86 attached to a conventional hotstick 20. The adapter 86 may be pivotally adjustable for facilitating installation from different angles. The hotstick 20 is used to position the cover 18 into place at least partially within the cavity 12 of a box beam 88 as shown (FIGS. 14B-D). Once positioned the male part 84 can be removed from cover 18. As shown, the cover 18 may take a variety of shapes as sufficient to block the respective cavity 12. In some cases the cover 18 may include a lid 90, which may comprise dielectric material, for at least partially overlapping the edges 95 of the cavity 12 on an external side 92 of the component, and plug material 40 that is configured to at least partially overlap the edges 95 of the cavity 12 on an internal side 94 of the component (FIG. 14B). One or more slots 96 may be defined between the lid 90 and plug material 40 for fitting the component edges 95 (FIG. 14A). The plug material 40 may have one or more tapered surfaces 97 to facilitate insertion. In some cases, the hotstick connector may have a male part and the engagement part of the hotstick 20 has a female part.

Figure 5A:
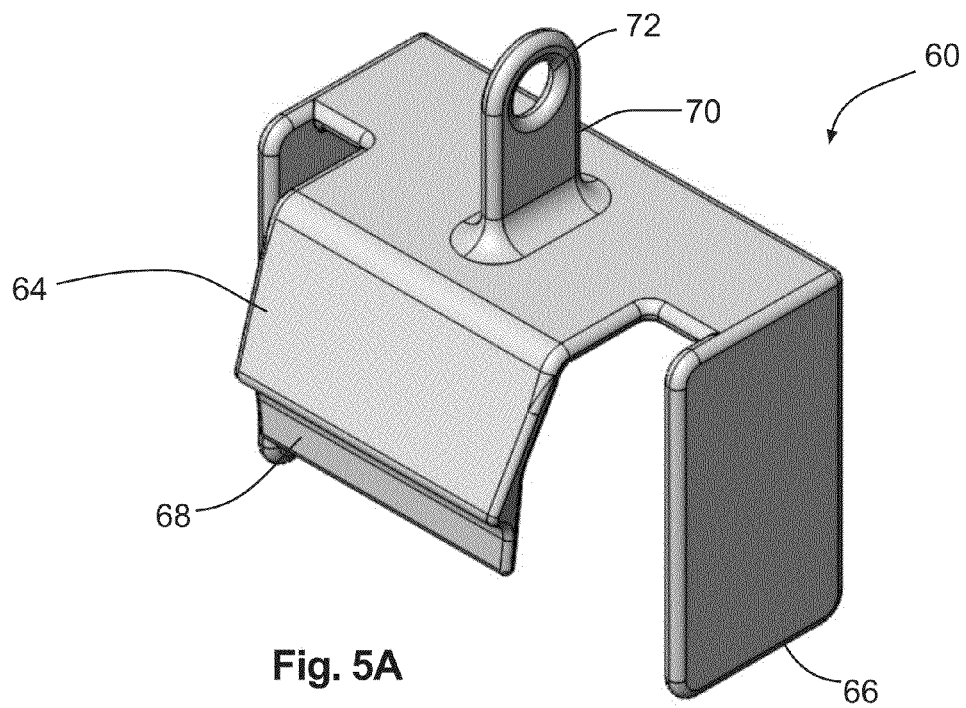
FIGS. 5A-5C are perspective views of an embodiment of an insert for protection of a cavity of a blade disconnect switch.
Figure 5B:
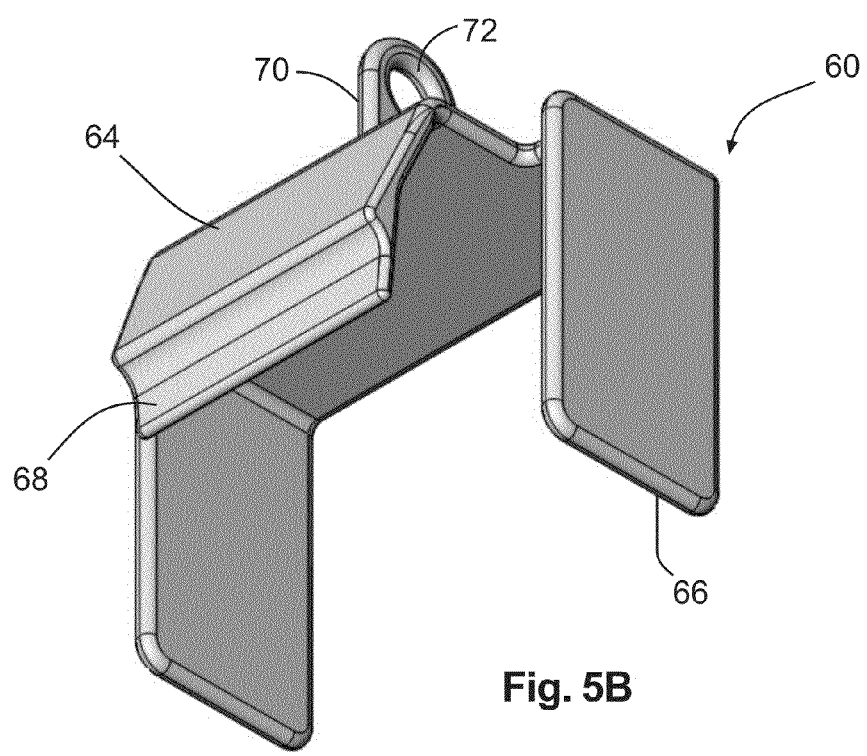
Figure 5C:
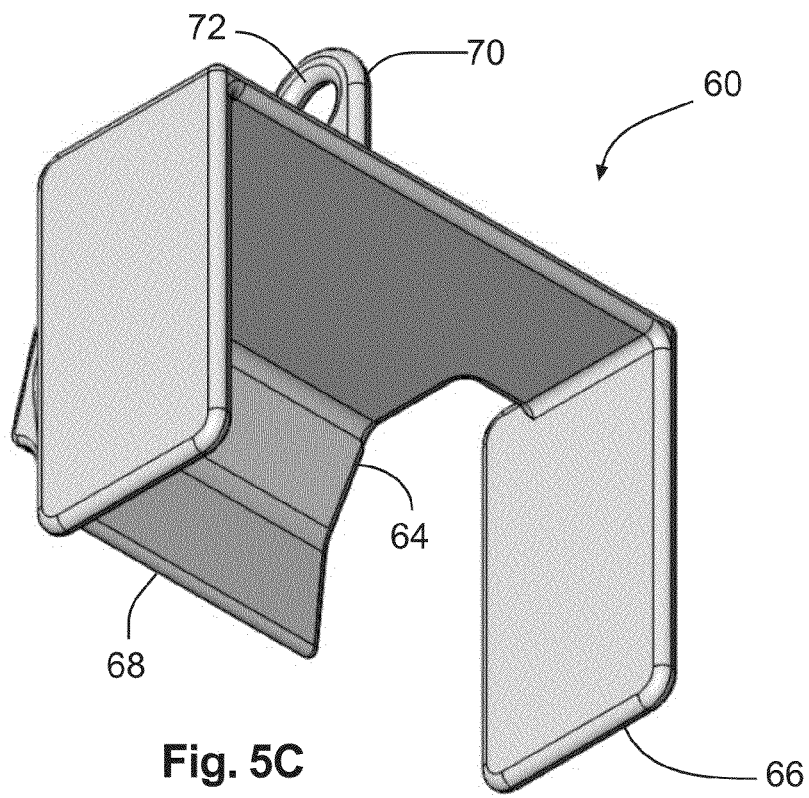
Figure 6A:
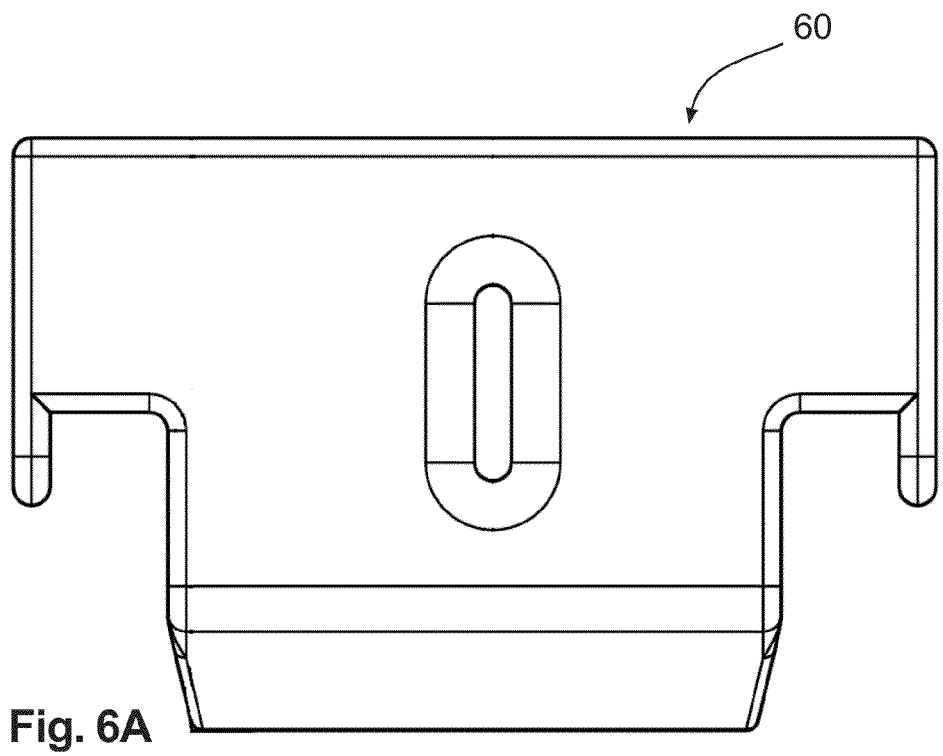
FIGS. 6A-6C are diagrams showing the insert of FIGS. 5A-5C from above, from the front, and from the side, respectively, with FIG. 6B also illustrating the hinge cup of the switch.
Figure 6B:
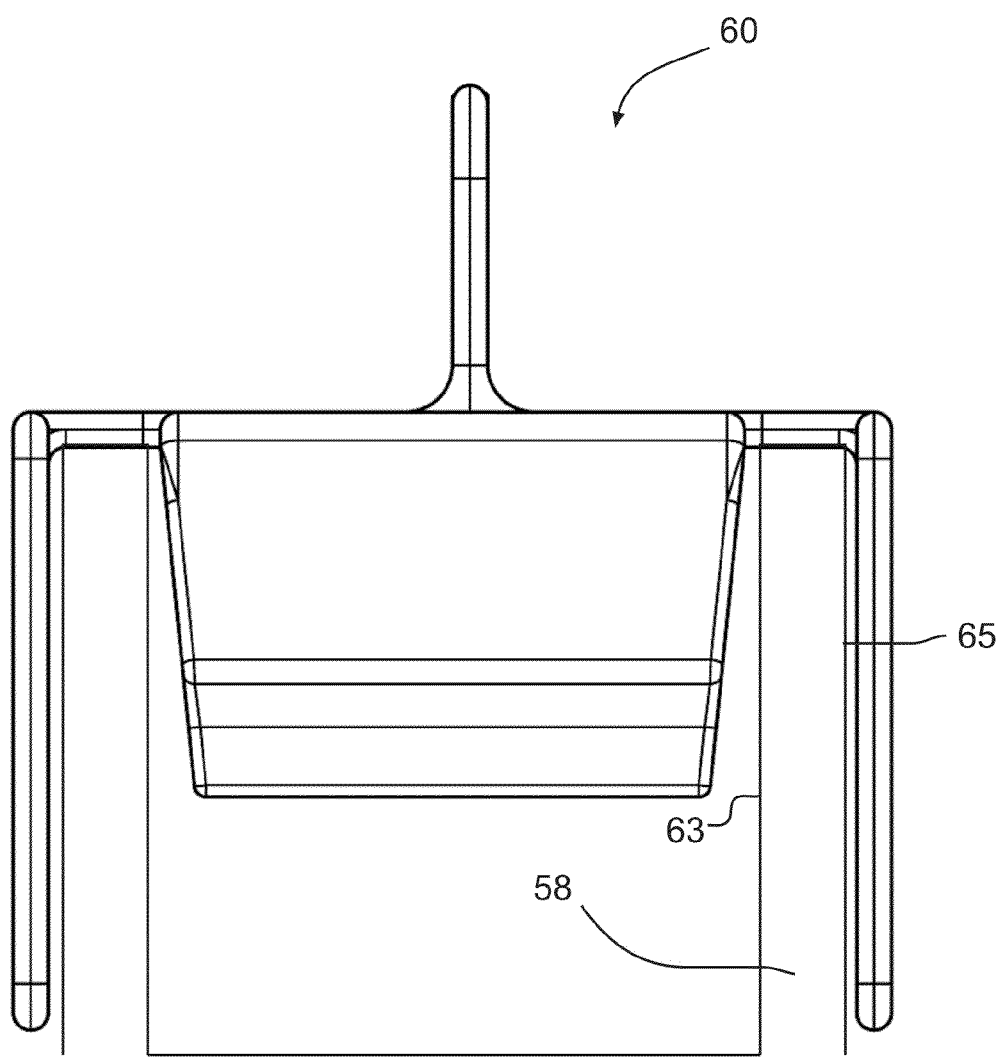
Figure 6C:
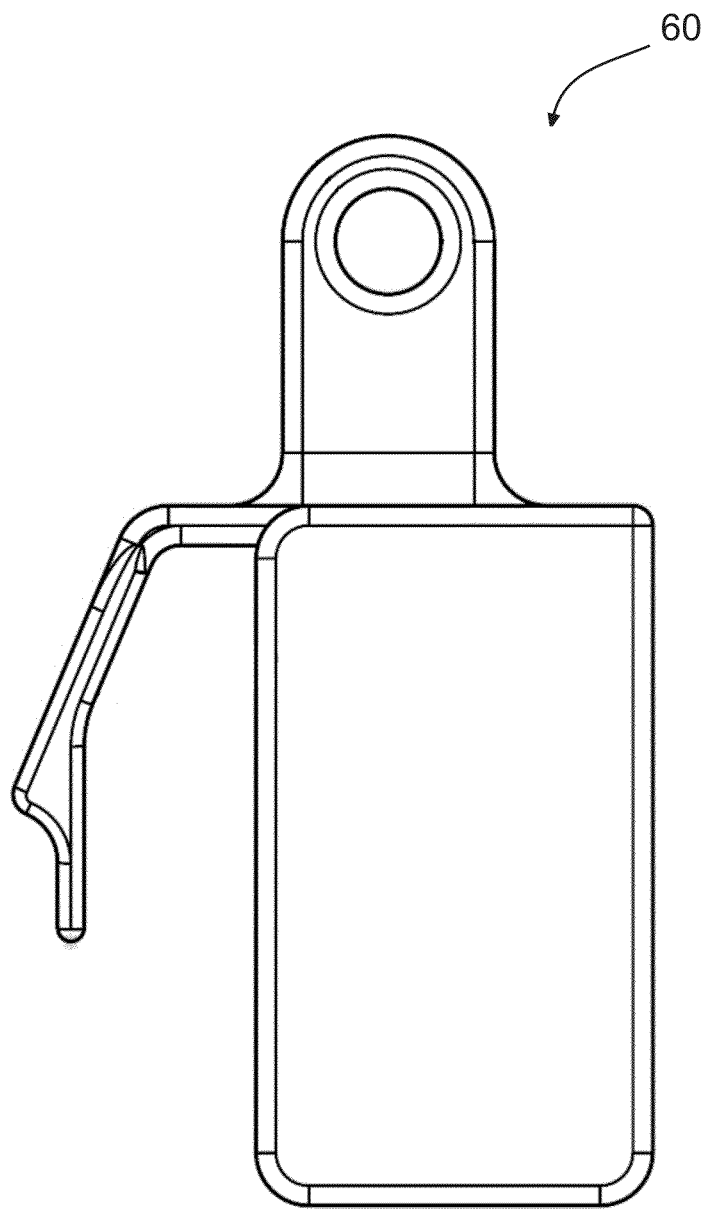
Figure 7:
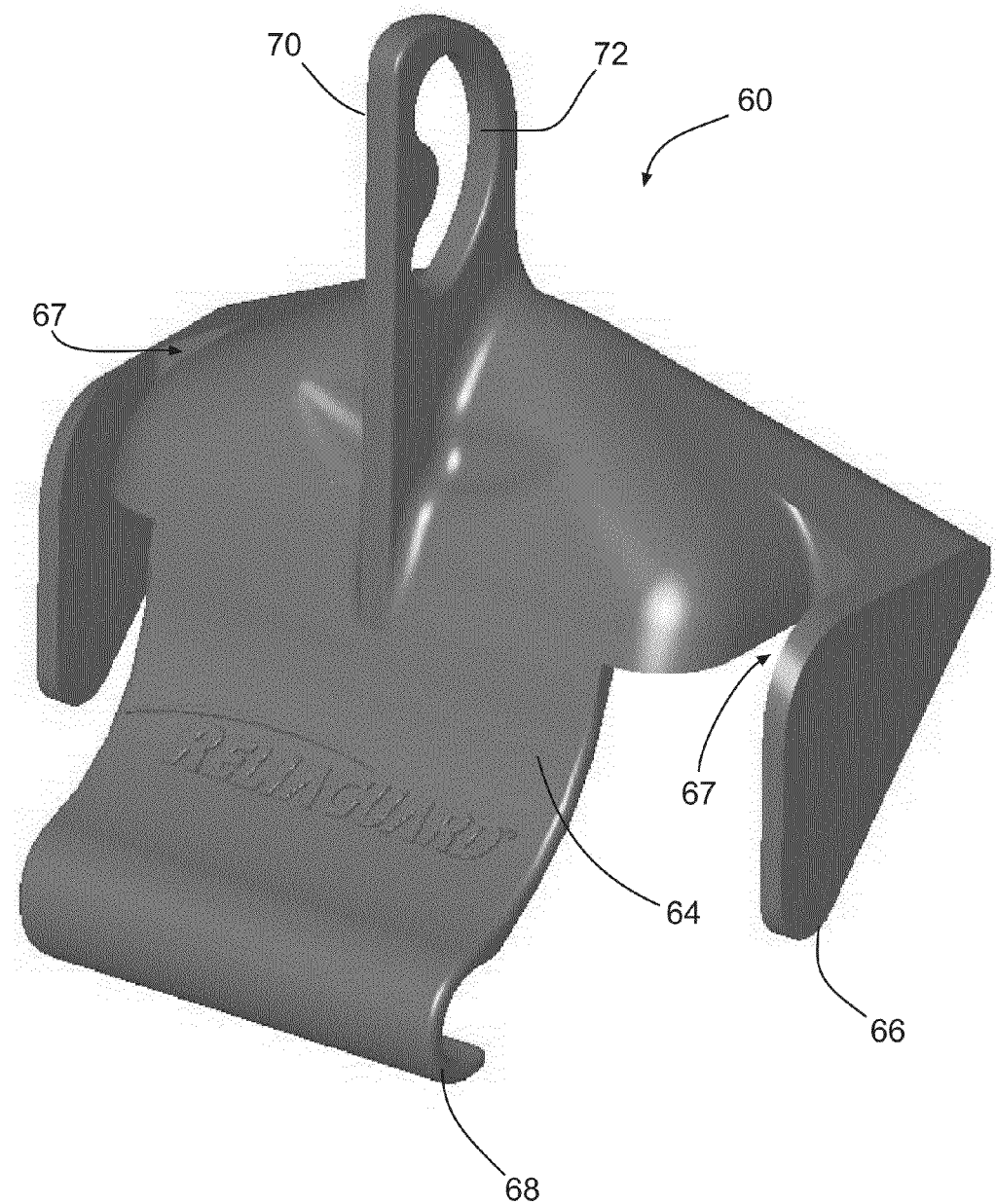
FIG. 7 is a perspective view of another embodiment of an insert for protection of a cavity of a blade disconnect switch.

Disconnect switches for electrical power systems may have a cavity such as a 3-sided cavity at the hinge of the switch which is usable as a nest site for animals, such as birds. Birds are usually too small to cause problems here but larger predators such as cats, raccoons, or possums may be drawn to the nest and subsequently electrocuted, causing a contact, which may lead to an outage. In order to deter nesting in the hinge cavity, a protector such as an insert 60 as shown in FIGS. 5A-13G may be used to deter nesting in the hinge cavity. FIGS. 5A-5C show a first embodiment of an insert 60 in perspective view, and FIGS. 6A-6C show diagrammatic top, front and side views of the same insert. The insert does not need to be dielectric. The insert may allow the switch to rotate (open and close). The insert has a blocking part 64 such as a tongue as shown for protecting the hinge cavity. In other cases blocking part 64 may comprise other suitable blocking features such as a screen, web or series of projections. The insert may have a guiding part 66 (e.g. side arms) for positioning and holding the insert in the cavity, for example by abutment against one or both of an external or internal part, such as inner and outer wall surfaces 63, 65, of the switch as shown in FIG. 6B. The guiding part 66 may have indents 67 to accommodate the switch bars 80 and thus allow the switch to be opened or closed without disruption from the insert (FIGS. 7 and 11). The guiding part 66 and blocking part 64 may collectively define an open C-shaped insert that can be lowered into position at least partially within the cavity (FIG. 6B). The insert may also have a pin engaging part 68 attached to the blocking part to engage a pin 74 (FIG. 10) of the hinge of the switch. In order to place the insert in the cavity the insert may have a tool connector 70 attached to the blocking part for engagement with the engagement part, such as a hook 42 of a tool such as a hotstick 20 for remotely placing the insert (FIG. 7). The tool connector may have an eyelet 72 for receiving hook 42. Suitable tools for placing the insert may include a hotstick such as a gripall, positive grip clamp stick, or shotgun stick. The insert may have a variety of shapes different from those shown in the figures, which are merely examples. The insert may also be used in switches other than the vertical disconnect switch shown in the figures. For example, the insert may be used with a fuse switch.

FIG. 7 shows a perspective view of a different embodiment of the insert 60. The pin engaging part 68 in this embodiment is further be configured to snap around a pin 74 (shown in FIG. 8) to help hold the insert in place in the hinge cup. The eyelet 72 is also crescent shaped in this embodiment.

Figure 8:
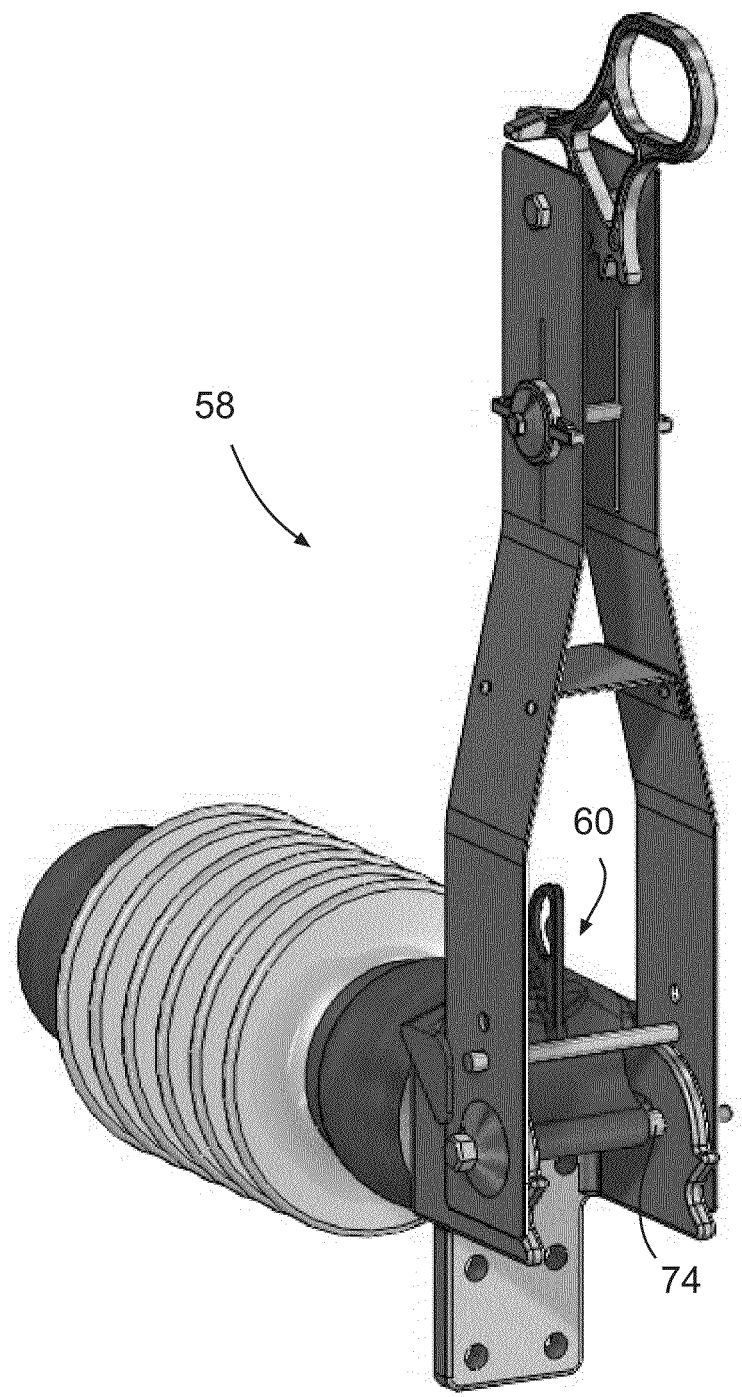
FIG. 8 is a perspective view of the insert of FIG. 7 installed in a switch with the switch in a closed position.

FIG. 8 is a perspective view of the insert 60 of FIG. 7 installed in a switch 58 with the switch 58 in a closed position.

Figure 9:
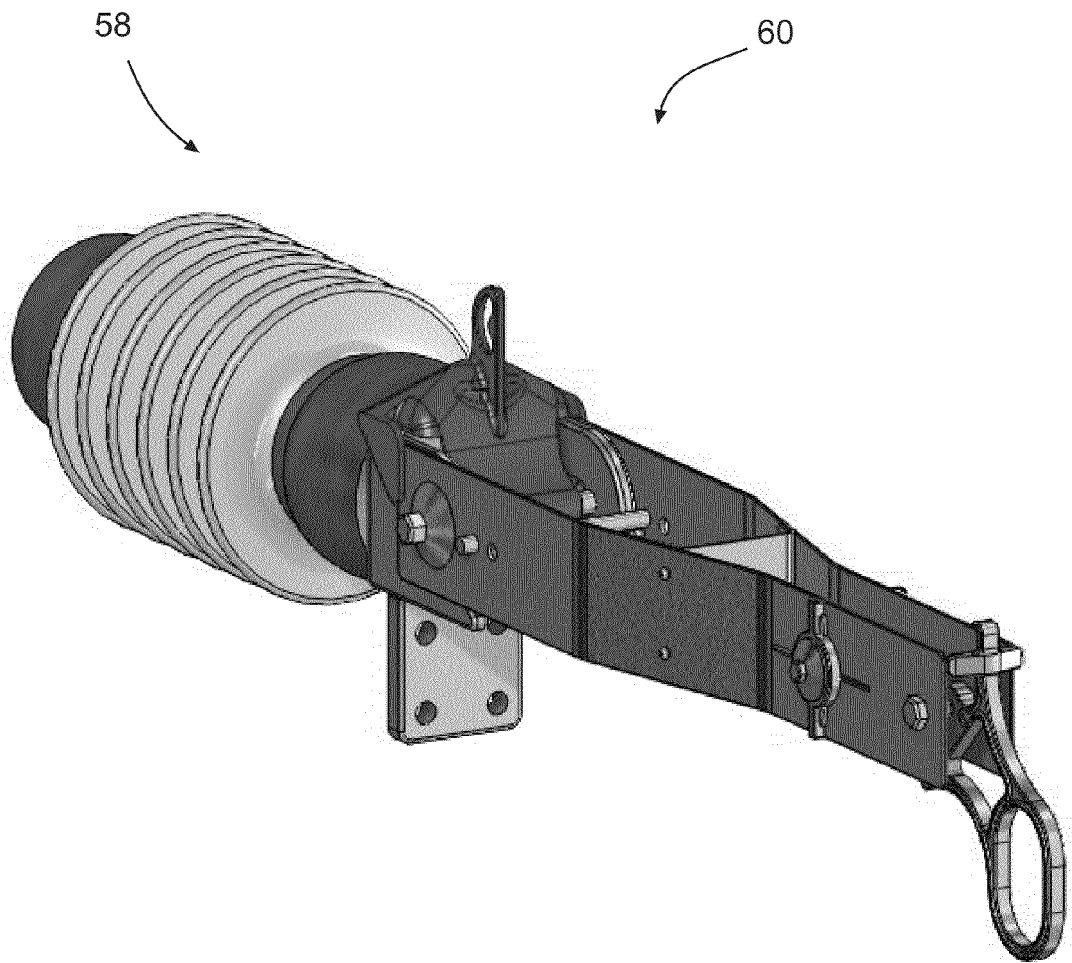
FIG. 9 is a perspective view of the insert of FIG. 7 installed in a switch with the switch in an open position.

FIG. 9 is a perspective view of the insert 60 of FIG. 7 installed in a switch 58 with the switch 58 in an open position.

Figure 10:
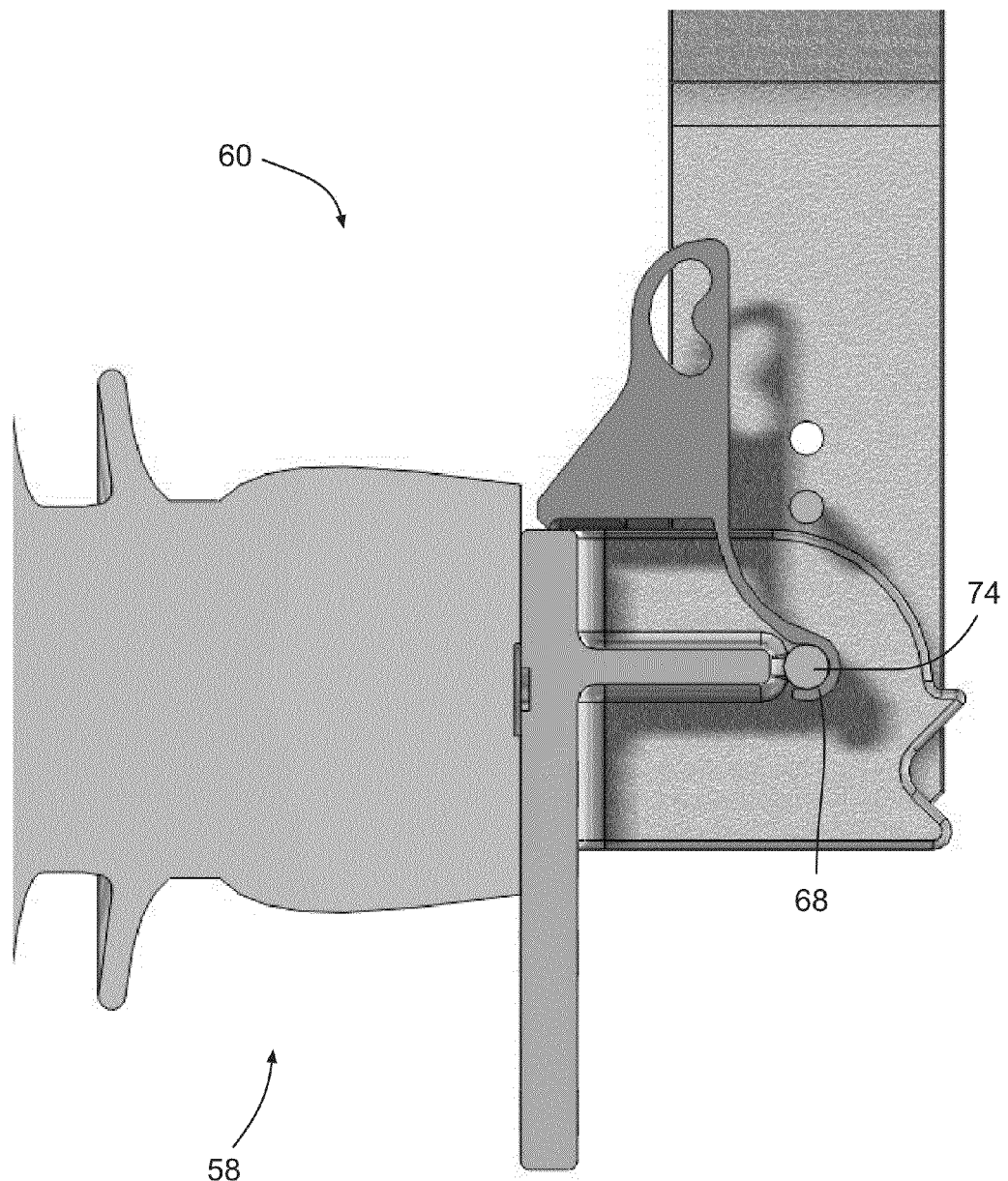
FIG. 10 is a side cutaway view of the insert of FIG. 7 installed in a switch with the switch in a closed position.
Figure 11:
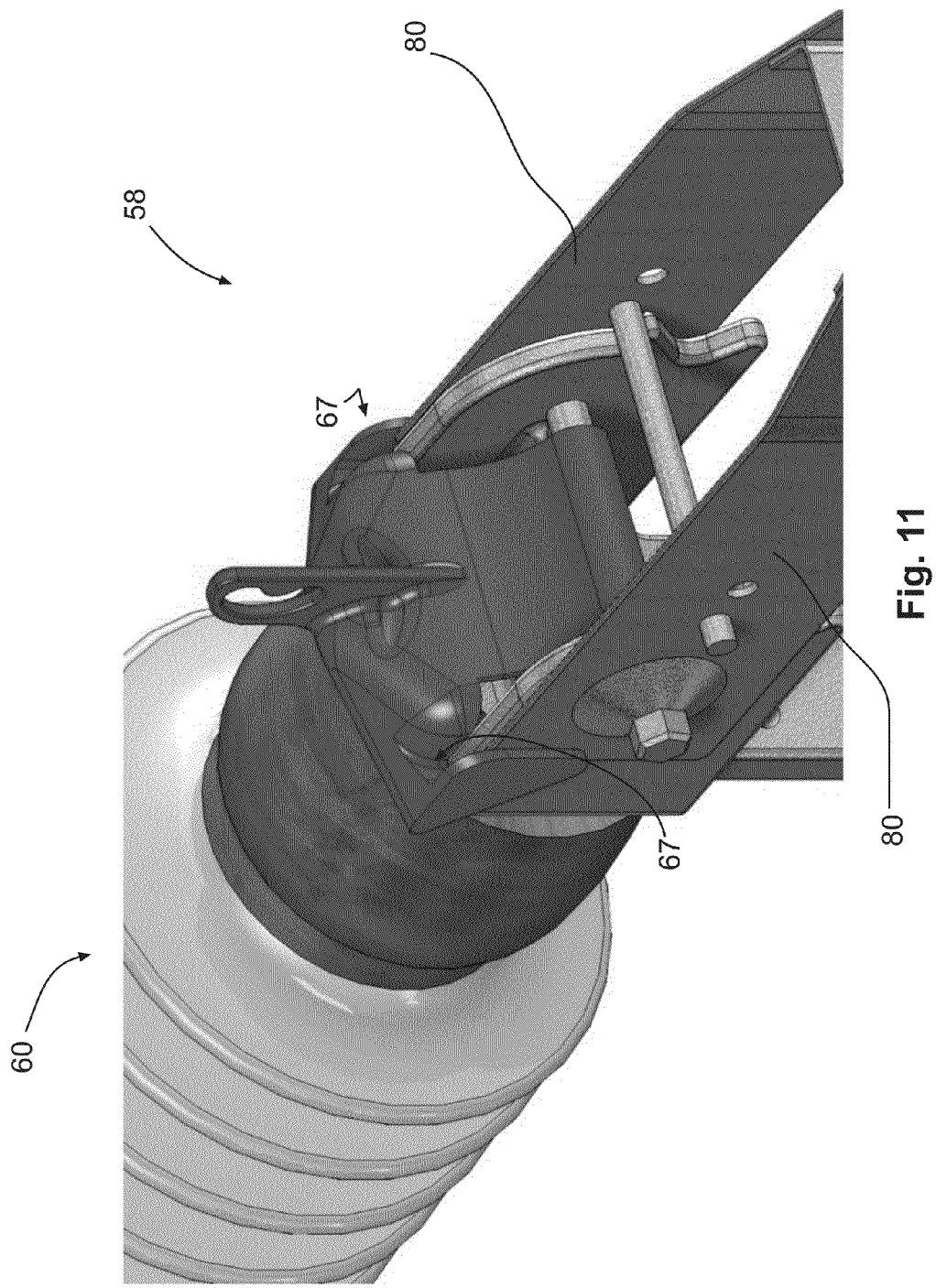
FIG. 11 is a closeup perspective view of the insert of FIG. 7 installed in a switch with the switch in an open position.

FIG. 10 is a side cutaway view of the insert 60 of FIG. 7 installed in a switch 58 with the switch 58 in a closed position.

FIG. 11 is a closeup perspective view of the insert 60 of FIG. 7 installed in a switch 58 with the switch 58 in an open position.

Figure 12:
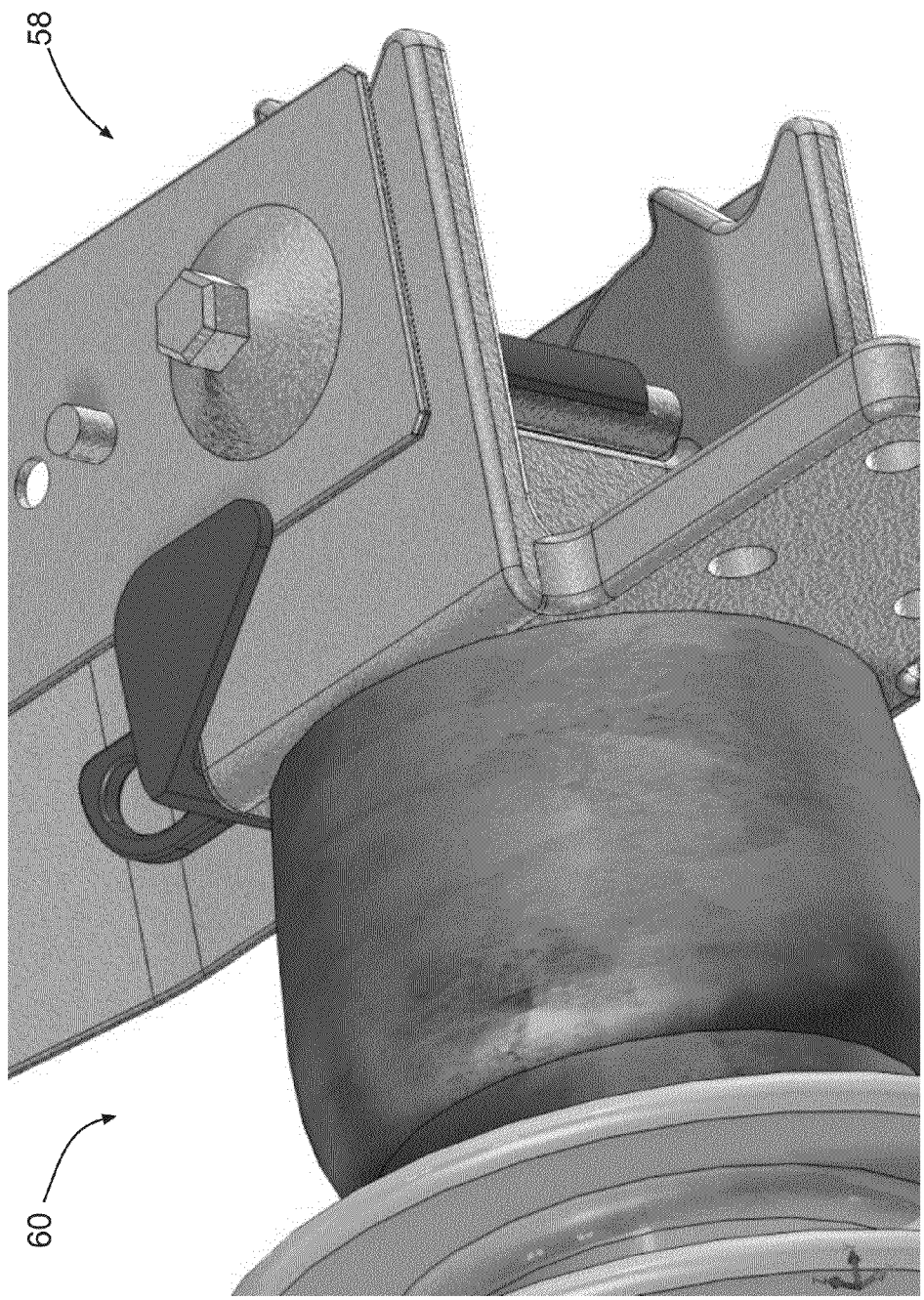
FIG. 12 is a closeup perspective view of a switch in a closed position with the insert of FIG. 7 visible.

FIG. 12 is a closeup perspective view of a switch 58 in a closed position with the insert 60 of FIG. 7 visible.

Figure 13A:
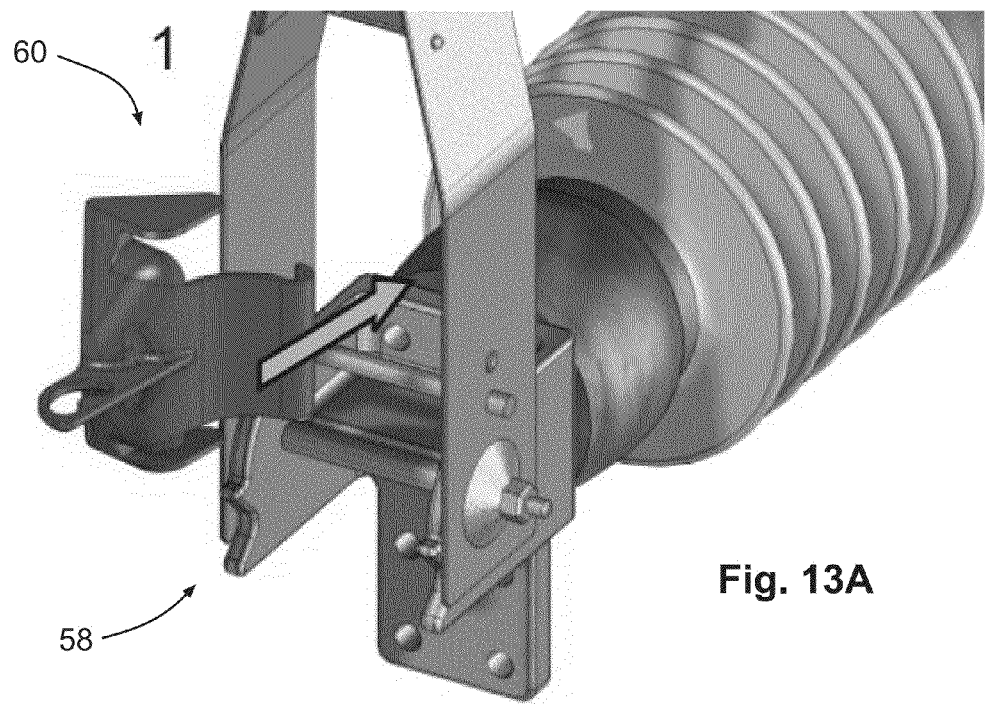
FIGS. 13A-13G are a sequence of perspective views showing a procedure to install the insert of FIG. 7 into a switch in a closed position.
Figure 13B:
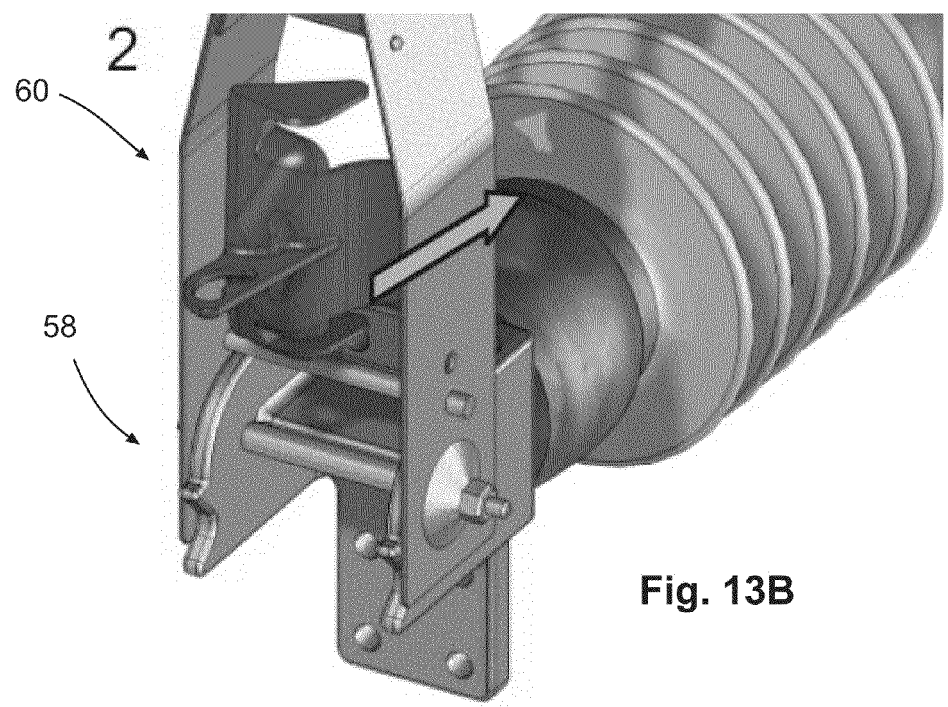
Figure 13C:
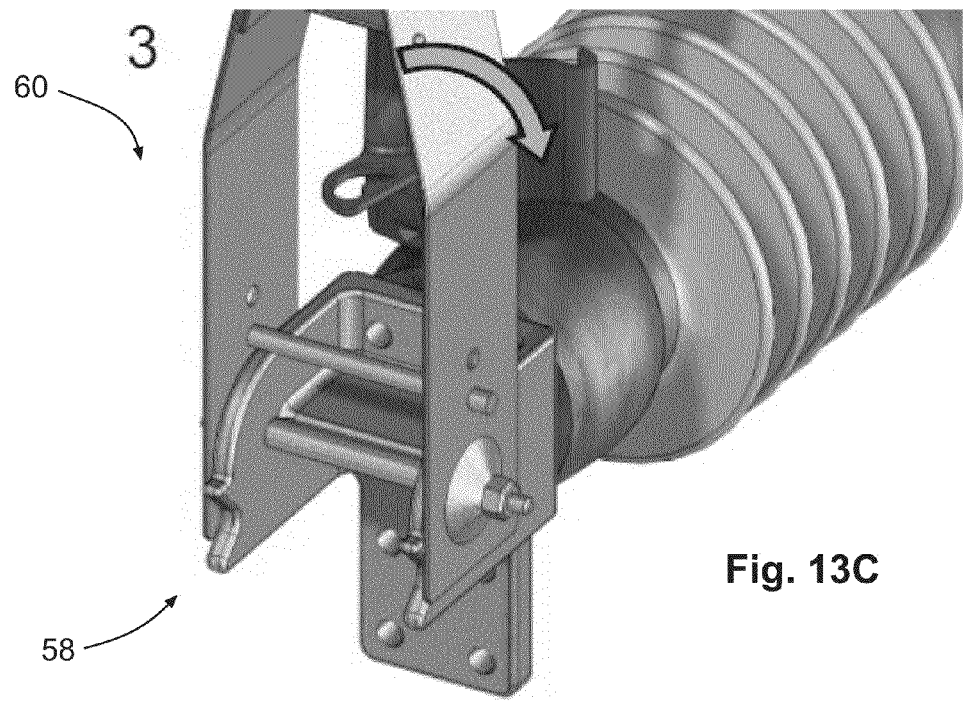
Figure 13D:
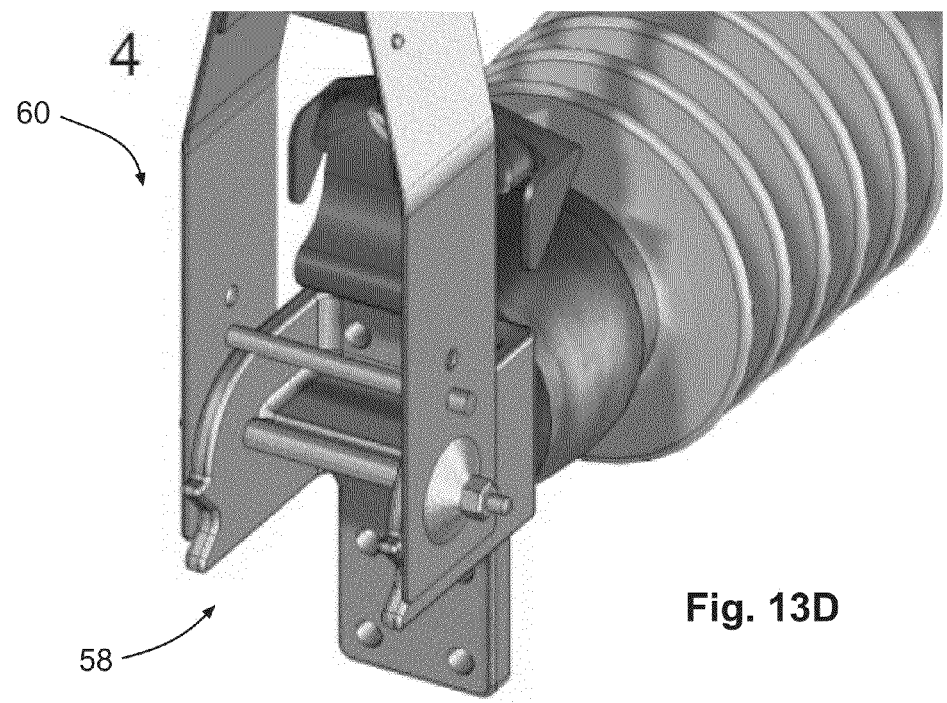
Figure 13E:
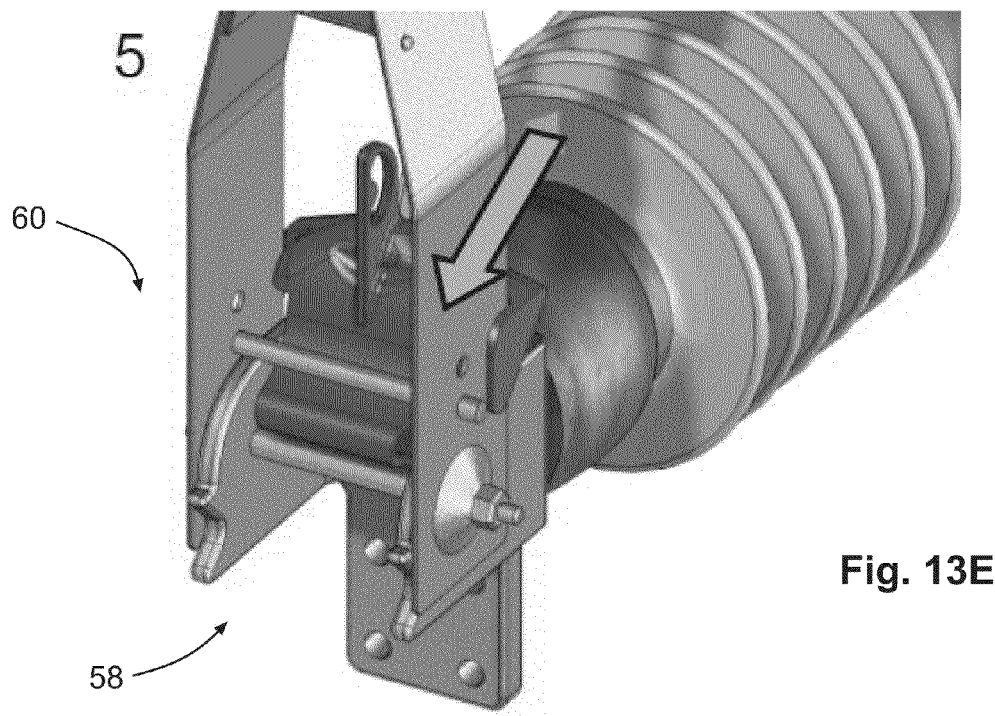
Figure 13F:
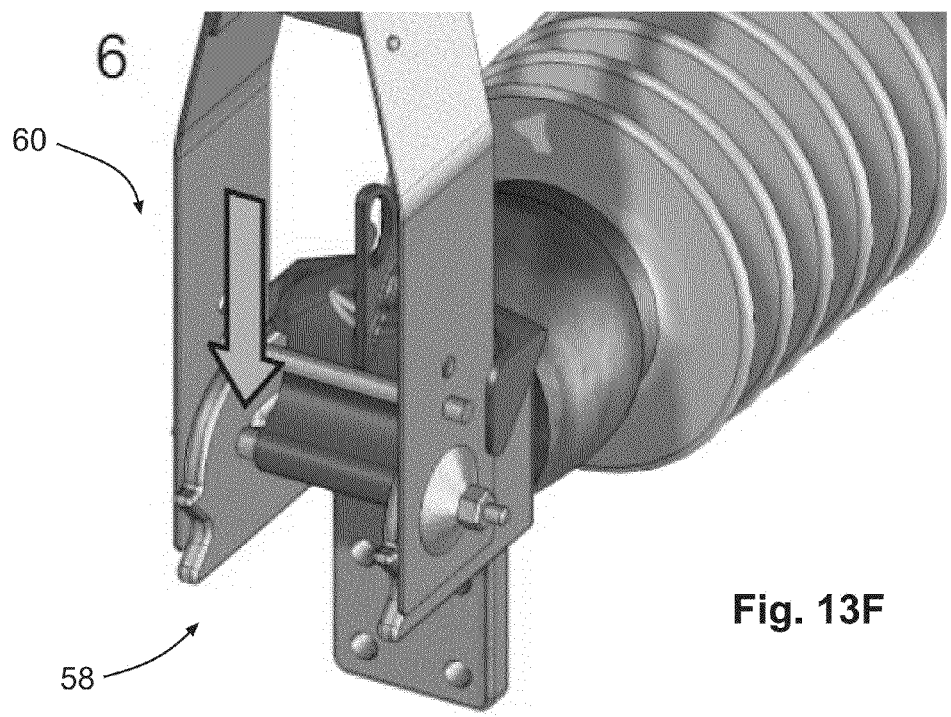
Figure 13G:
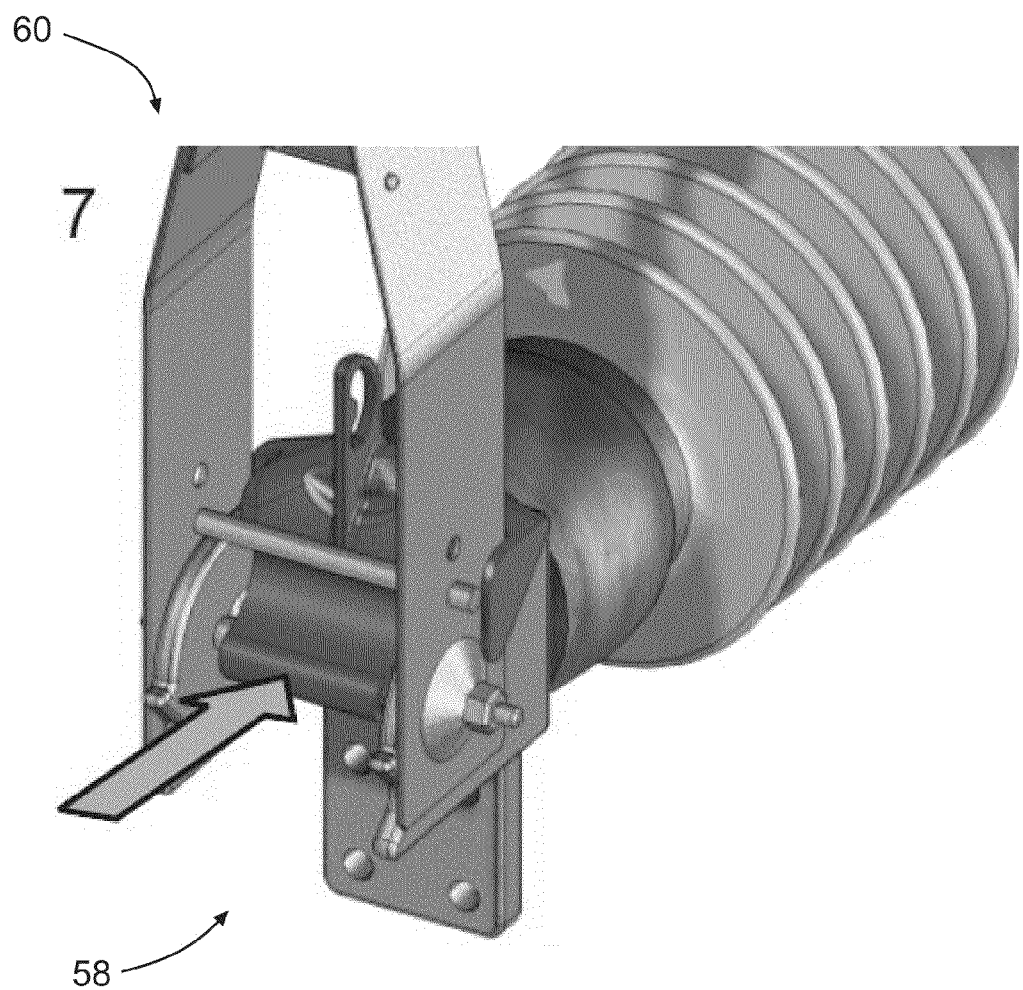

FIGS. 13A-13G are a sequence of perspective views showing a procedure to install the insert 60 of FIG. 7 into a switch 58 in a closed position. The insert is gripped by a retracted hook 42 (not shown) of a hotstick to force the insert to assume a horizontal position to allow the insert to fit between spaced bars 80 of the switch 58 to position the insert above the hinge cavity in FIGS. 13A and 13B. Extension of the hook 42 allows the insert to rotate by gravity in FIG. 13C to orient it into the orientation (shown in FIG. 13D) that it will have when placed, and the use of a crescent shaped eyelet facilitates such rotation as the bulk of the insert weight is spaced from the tool connector and thus guides the insert into the desired orientation. In FIG. 13E the insert is finally lowered and moved forward to drop into position in FIG. 13F and then pulled back in FIG. 13G to snap around the hinge pin 74 (see also FIG. 10). The sequence described may be carried out on an energized system, with the switch open or closed.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus comprising:
    a component of an energized electrical transmission system, the component having a cavity, the component comprising a bus, the bus being a hollow conductor that defines the cavity;
    a protector having a blocking part at least partially in and blocking the cavity of the component, the protector having a hotstick connector; and
    a dielectric hotstick with an engagement part at a remote end of the dielectric hotstick, the engagement part engaging the hotstick connector during remote installation of the blocking part at least partially in the cavity of the component.

2. The apparatus of claim 1 in which the hotstick connector comprises an external eyebolt, and the engagement part of the dielectric hotstick comprises a hook.

3. The apparatus of claim 2 in which the dielectric hotstick comprises a hook control element at an end of the dielectric hotstick opposed to the remote end, the hook control element being connected to open and close the hook to grip and release, respectively, the eyebolt.

4. The apparatus of claim 2 in which the eyebolt extends from an external end of the protector opposed to the blocking part, the external end adapted to be outset front the cavity of the component when installed blocking the cavity.

5. The apparatus of claim 4 in which the external end is flat.

6. The apparatus of claim 5 in which the protector comprises a plug.

7. The apparatus of claim 1 in which the blocking part comprises memory foam.

8. The apparatus of claim 1 in which the blocking part comprises rubber.

9. The apparatus of claim 1 in which the protector comprises material that is laterally expandable under longitudinal compression to engage an inside surface of a component, and a clamp for providing longitudinal compression on the material.

10. The apparatus of claim 1 in which the hotstick connector comprises one or more female parts, and the engagement part of the dielectric hotstick comprises one or more corresponding male parts.

11. The apparatus of claim 1 in which the cavity is an open end of the component.

12. An apparatus comprising:
    a component of an energized electrical transmission system, the component having a cavity, the component comprising a bus, the bus being a hollow conductor that defines the cavity;
    a protector having a blocking part blocking the cavity of the component, the blocking part comprising material that is laterally expandable under longitudinal compression to engage an inside surface of a component, and a clamp for providing longitudinal compression on the material.

13. The apparatus of claim 12 in which the material comprises memory foam.

14. An apparatus comprising:
    a switch of an electrical transmission system, the switch having a hinge with a hinge cavity and a pin;
    a tool having an engagement part and a handle part;
    an insert with a blocking part placed at least partially in and blocking the hinge cavity, the insert further comprising a pin engaging part attached to the blocking part to engage the pin;
    a tool connector attached to the blocking part and engaged with the engagement part of the tool during remote placement of the insert; and
    a guiding part attached to the blocking part for engaging, during remote placement of the insert, an external or internal part of the switch to secure the insert in the hinge cavity.

15. The apparatus of claim 14 in which the engagement part of the tool comprises a hook and the tool connector comprises an eyelet for receiving the hook.

16. The apparatus of claim 15 in which the eyelet is crescent shaped.

17. The apparatus of claim 14 in which the pin engaging part is configured to snap around the pin to help hold the insert in place in the hinge cup.

18. The apparatus of claim 14 in which the blocking part comprises a tongue.

* * * * *